US012614542B1

(12) United States Patent
Sarikaya et al.

(10) Patent No.: US 12,614,542 B1
(45) Date of Patent: Apr. 28, 2026

(54) ACTION PREDICTION

(71) Applicant: Amazon Technologies, Inc., Seattle, WA (US)

(72) Inventors: Ruhi Sarikaya, Redmond, WA (US); Chenlei Guo, Redmond, WA (US); Priti Bisaria, Menlo Park, CA (US); Vasiliy Radostev, Seattle, WA (US); Xing Fan, Redmond, WA (US); Muddu Krishna Chintha, Dublin, CA (US); Jie Bao, Sammamish, WA (US); Xiaohu Liu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 370 days.

(21) Appl. No.: 18/082,687

(22) Filed: Dec. 16, 2022

(51) Int. Cl.
| | |
|---|---|
| *G10L 15/22* | (2006.01) |
| *G10L 15/16* | (2006.01) |
| G10L 15/08 | (2006.01) |
| G10L 15/18 | (2013.01) |
| G10L 15/30 | (2013.01) |

(52) U.S. Cl.
CPC .............. *G10L 15/16* (2013.01); *G10L 15/22* (2013.01); *G10L 2015/088* (2013.01); *G10L 15/1815* (2013.01); *G10L 2015/223* (2013.01); *G10L 2015/227* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 9,986,394 | B1 * | 5/2018 | Taylor | H04W 4/18 |
| 10,276,170 | B2 * | 4/2019 | Gruber | G06F 16/9537 |
| 10,482,885 | B1 * | 11/2019 | Moniz | G06F 3/167 |
| 11,081,099 | B2 * | 8/2021 | Lewis | G10L 13/02 |
| 11,380,304 | B1 * | 7/2022 | Ponnusamy | G10L 15/1822 |
| 11,501,781 | B2 * | 11/2022 | Tukka | G06F 9/4418 |
| 12,051,428 | B1 * | 7/2024 | Petrochuk | G10L 25/30 |
| 2013/0275164 | A1 * | 10/2013 | Gruber | G06Q 10/02 |
| | | | | 705/5 |
| 2019/0182261 | A1 * | 6/2019 | Carbune | H04W 12/06 |
| 2019/0266999 | A1 * | 8/2019 | Chandrasekaran | G06F 3/167 |
| 2019/0378500 | A1 * | 12/2019 | Miller | G06F 3/167 |

(Continued)

*Primary Examiner* — Seong-Ah A Shin
(74) *Attorney, Agent, or Firm* — Pierce Atwood LLP

(57) ABSTRACT

A computer-implemented method is disclosed that involves receiving first data representing at least one current contextual state of a first user corresponding to a first user profile, and determining, using the first data and a graph neural network (GNN) that has been trained using graph data representing a graph, that the first user is in a first situational context corresponding to a first one of a plurality of first nodes in the graph, wherein the plurality of first nodes correspond to respective ones of a plurality of possible situational contexts, wherein the graph further includes a second node corresponding to the first user and a first edge connected to the second node, and wherein second data representing a prior contextual state of the first user is associated with the first edge. Based at least in part on the first user being in the first situational context, a first action of a plurality of possible actions to be executed with respect to the first user profile may be determined, and a device corresponding to the first user profile may be caused to take the first action.

18 Claims, 14 Drawing Sheets

(56)　　　　　References Cited

U.S. PATENT DOCUMENTS

| | | | | |
|---|---|---|---|---|
| 2019/0385615 | A1* | 12/2019 | Sharifi | G10L 17/00 |
| 2020/0380972 | A1* | 12/2020 | Carrigan | H04L 63/0861 |
| 2020/0380980 | A1* | 12/2020 | Shum | G10L 15/18 |
| 2021/0012779 | A1* | 1/2021 | Mixter | G10L 21/0216 |
| 2022/0013129 | A1* | 1/2022 | Carbune | G06F 3/167 |
| 2022/0020363 | A1* | 1/2022 | Vasquez | G10L 15/22 |
| 2022/0189470 | A1* | 6/2022 | Sharifi | G10L 15/08 |
| 2023/0119954 | A1* | 4/2023 | Madwed | G06F 3/167 |
| | | | | 704/9 |

\* cited by examiner

FIG. 1A

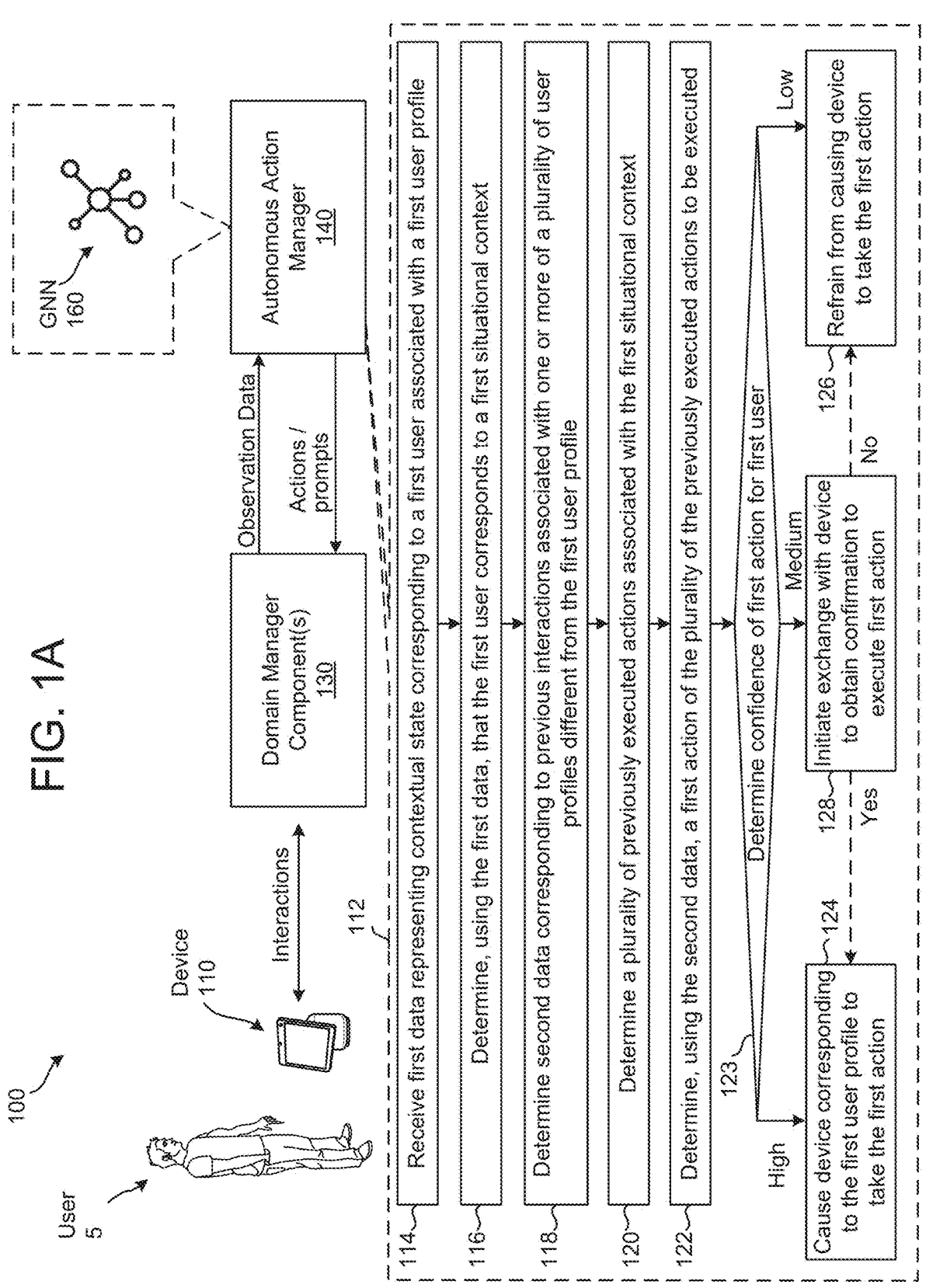

GNN 160

Autonomous Action Manager 140

Observation Data

Actions / prompts

Domain Manager Component(s) 130

Interactions

Device 110

User 5

100

112

114 — Receive first data representing contextual state corresponding to a first user associated with a first user profile 116 — Determine, using the first data, that the first user corresponds to a first situational context 118 — Determine second data corresponding to previous interactions associated with one or more of a plurality of user profiles different from the first user profile 120 — Determine a plurality of previously executed actions associated with the first situational context 122 — Determine, using the second data, a first action of the plurality of previously executed actions to be executed 123 — Determine confidence of first action for first user High Medium Low 124 — Cause device corresponding to the first user profile to take the first action 128 — Initiate exchange with device to obtain confirmation to execute first action Yes No 126 — Refrain from causing device to take the first action

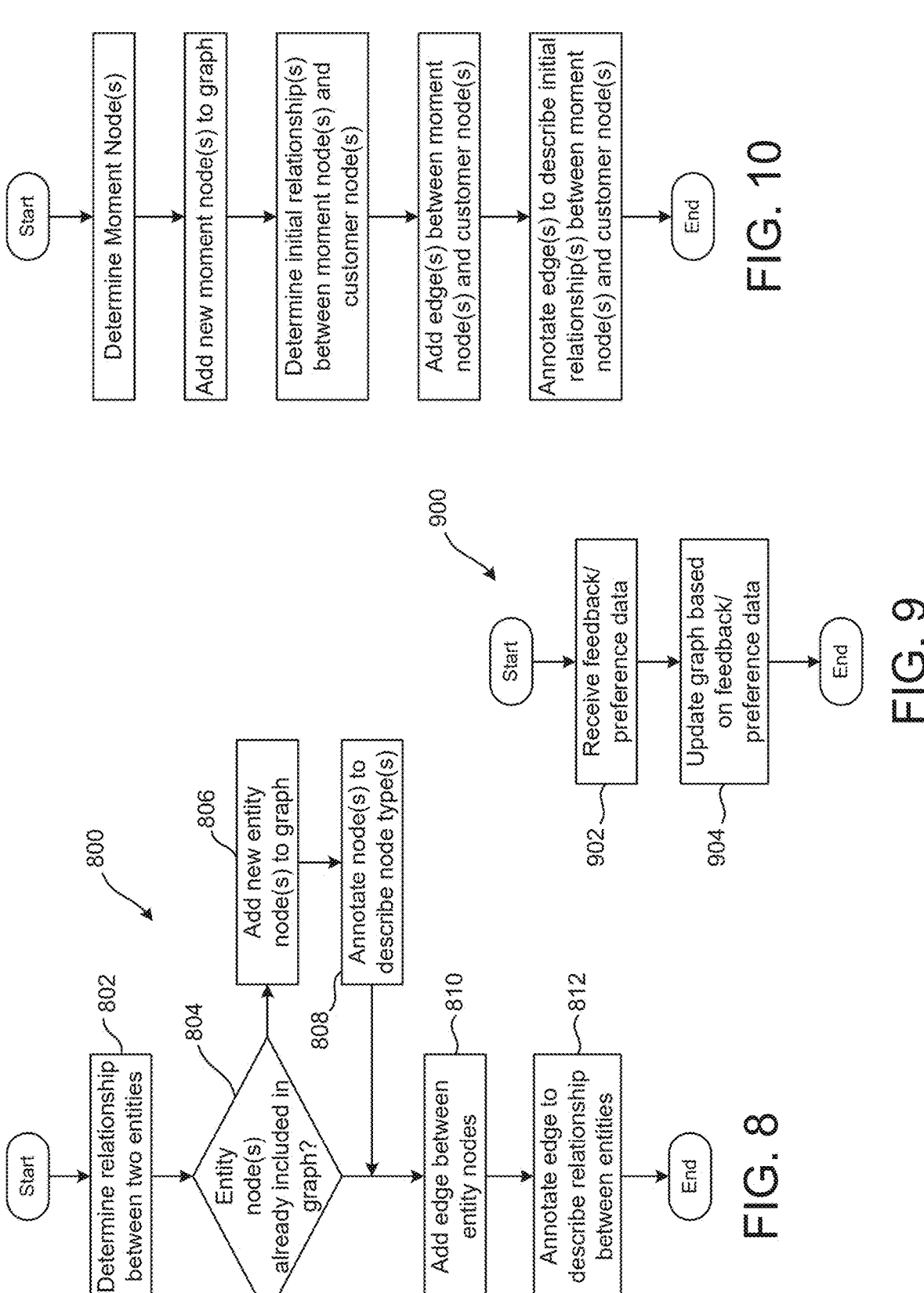

Start

Determine Moment Node(s)

Add new moment node(s) to graph

Determine initial relationship(s) between moment node(s) and customer node(s)

Add edge(s) between moment node(s) and customer node(s)

Annotate edge(s) to describe initial relationship(s) between moment node(s) and customer node(s)

End

Start

Receive feedback/ preference data    902

Update graph based on feedback/ preference data    904

End

Start

Determine relationship between two entities    802

Entity node(s) already included in graph?    804

Add new entity node(s) to graph    806

Annotate node(s) to describe node type(s)    808

Add edge between entity nodes    810

Annotate edge to describe relationship between entities    812

End

Trainable weight matrices                    1100

$$h_v^{(l+1)} = \sigma\left(W_l \sum_{u \in N(v)} \frac{h_u^{(l)}}{|N(v)|} + B_l h_v^{(l)}\right), \forall l \in \{0, \ldots, L-1\}$$

$$z_v = h_v^{(L)}$$

Final node embedding

X feature matrix                    graph structure effect                    H Embedding matrix Transform

FIG. 15

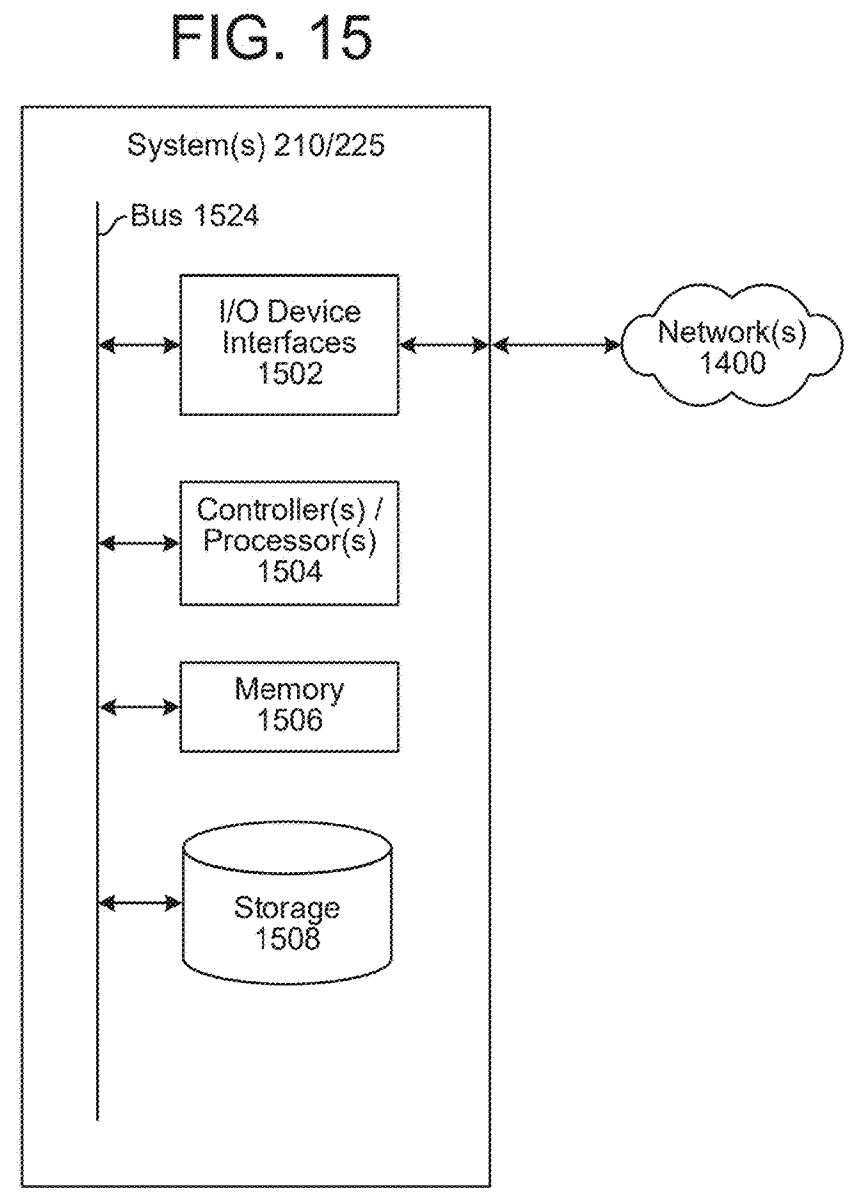

Network(s) 1400

System(s) 210/225

Bus 1524

I/O Device Interfaces 1502

Controller(s) / Processor(s) 1504

Memory 1506

Storage 1508

ACTION PREDICTION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a first conceptual diagram illustrating a virtual assistant system for automatically taking actions on behalf of a user in appropriate circumstances, according to embodiments of the present disclosure.

FIG. 8 is a flow diagram of a second example process for adding features to a customer habitual graph, according to embodiments of the present disclosure.

FIG. 9 is a flow diagram of an example process for modifying features of a customer habitual graph based on user inputs, according to embodiments of the present disclosure.

FIG. 10 is a flow diagram of an example process for adding moment nodes and initial edges to a customer habitual graph, according to embodiments of the present disclosure.

FIG. 15 is a block diagram conceptually illustrating example components of a system, according to embodiments of the present disclosure.

DETAILED DESCRIPTION

Figure 1B:
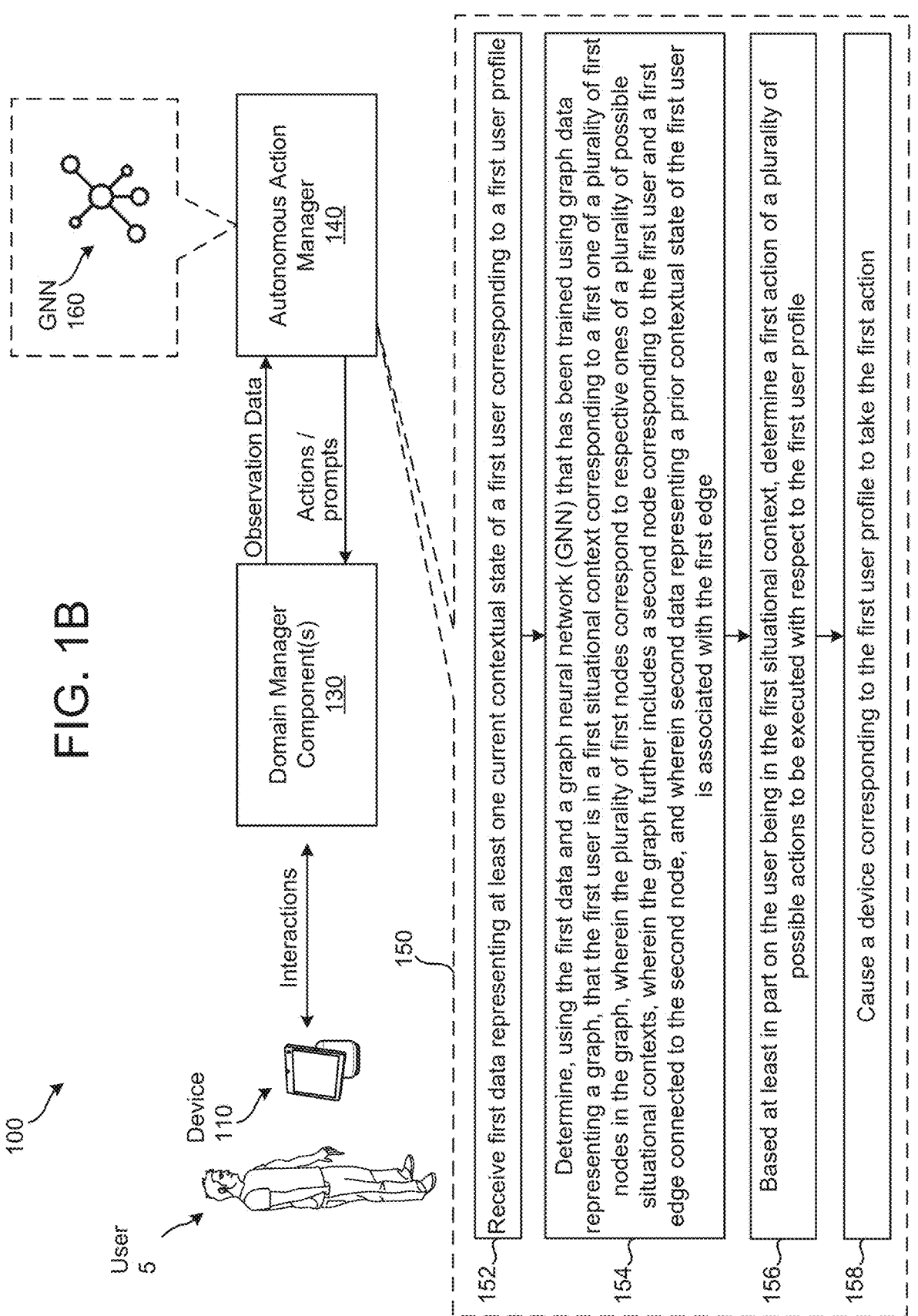
FIG. 1B is a second conceptual diagram illustrating a virtual assistant system for automatically taking actions on behalf of a user in appropriate circumstances, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

A system configured consistent with what is disclosed herein may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Virtual assistant systems are generally user driven, that is, they respond to voice inputs (e.g., queries or commands) uttered by a user by taking appropriate actions (e.g., answering a question, playing a particular song, or dimming the lights) corresponding to such voice inputs. While such user-driven voice controlled systems provide many benefits and can ordinarily meet users' needs quite well, it may be desirable, as offered herein, to improve the user experience by automatically recognizing other, non-user-driven circumstances in which a virtual assistant system might be able to do something useful for a user, identifying appropriate actions to take in such circumstances, and, in at least some cases, automatically taking such actions.

Offered are, among other things, an event-driven architecture and methods that can evaluate near real-time data relating to the current (including recent past) contextual state of the user, gleaned from various sources, to identify particular periods of time (referred to herein as "moments") during which a user is in a specific situational context (e.g., "cooking," "driving," "family time," "focus," "party time," "relaxing," "sleep," "waking up," "walking," "running," etc.), and use those moments to trigger appropriate actions. Thus a moment may represent a particular instance or period of time during which a virtual assistant system can be configured to do something affirmatively, which the user may find useful, based on where a user is, what the user is doing, and/or what's happening around the user. The contextual state data that is received as input(s) and evaluated to identify such moments may be any data that represents a change in the user's contextual state, such a detected activity of the user (e.g., putting in wireless earbuds, entering a car, walking out of home, etc.), a user interface (UI) operation (e.g., tapping a button on an Alexa Mobile app), a timer click, or a meaningful utterance passed through an NLU system.

In some implementations, in addition to identifying such moments for a user, the system can be configured to identify meaningful actions that can be taken during such moments. For example, the system can be configured to play jazz music through Amazon Music on the user's Echo Buds when a "relaxing" moment is identified. In some implementations, the system may determine a level of confidence that it has accurately identified a moment and/or that an action should be taken during an identified moment, and based on that confidence level, may either perform the action autonomously (e.g., without requesting user confirmation) or may instead request the user to confirm that the identified action should be taken and take the action only upon receipt of such confirmation. In those instances in which user confirmation is requested, the feedback provided by the user may be used to modify the model(s) used to predict moments and/or actions, thus improving the accuracy of the moment/action predictions, and increasing the likelihood that the system will be able to autonomously perform an appropriate action (based on a moment prediction) on subsequent occasions.

FIGS. 1A and 1B are conceptual diagrams of virtual assistant system 100 configured to enable the performance of autonomous actions on behalf of a user 5, in accordance with some embodiments of the present disclosure. As shown in FIGS. 1 and 1B, the virtual assistant system 100 may include a voice-enabled device 110 local to the user 5, one or more domain manager component(s) 130, and an autonomous action manager 140. In some implementations, the domain manager component(s) 130 can communicate with the device 110 via one or more networks (not illustrated), which may include the internet. As described below in connection with FIGS. 2-3, for example, in some implementations, the domain manager component(s) 130 may be implemented by one or more natural language processing (NLP) system components 210, as well as one or more skill system component(s) 225, which may together enable the virtual assistant system 100 provide services for one or more domains. In FIGS. 1A and 1B, such NLP processing components 210 and/or skill system component(s) 225 are illustrated collectively as domain manager component(s) 130. In some implementations, the autonomous action manager 140 may likewise be implemented by one or more of the NLP components 210 and/or by one or more other components that are in communication with the NLP components 210, e.g., via a network. In other implementations, the domain manager component(s) 130 and/or the autonomous action manager 140 may additionally or alternatively be implemented, in whole or in part, by one or more components of the device 110.

As shown in FIGS. 1A and 1B, the autonomous action manager 140 can ingest and evaluate data from the domain manager component(s) 130 and, based on that data, can either instruct the domain manager component(s) 130 to take particular actions or prompt the user 5 for feedback with respect to actions that can potentially be taken.

FIG. 1A also shows a first example process 112 that may be performed by the autonomous action manager 140 in accordance with some embodiments. As shown, at a step 114 of the process 112, the autonomous action manager 140 may receive first data representing a contextual state corresponding to a first user associated with a first user profile. For example, as explained in more detail below in connection with FIG. 4, the domain manager component(s) 130 may maintain a profile corresponding to the user 5, and a data ingestion component 410 of the autonomous action manager 140 may receive any of a number of types of data representing a current contextual state of the user 5, such as the current time of day, the current day of the week, an identifier of the device 110 being operated by the user 5, the current location of the user 5 (e.g., at home, in a car, at work, etc.), the most recent utterance of the user 5, the most recent NLU intent determined for the user 5, the current operational state the device 110 (e.g., playing music, running a timer, idle), etc.

At a step 116 of the process 112, the autonomous action manager 140 may determine, using the first data, that the first user corresponds to a first situational context. As described below, for example, a plurality of nodes in a customer habitual graph (CHG) 600 (shown in FIG. 6) may correspond to respective ones of a plurality of possible situational contexts, and data representing one or more prior contextual states of the user 5 may be associated with one or more edges of the CHG 600. In some implementations, a graph path reasoner 434 of the moment/action forecasting component 430 (shown in FIG. 4) may include a GNN (e.g., GNN 160 illustrated in FIGS. 1A-1B) that is trained using the CHG 600 (shown in FIG. 6), so as to enable the GNN to process a feature vector representing the first data (e.g., representing a current contextual state of the user 5) to traverse (or "walk") from one node in the CHG 600 corresponding to the user 5 (e.g., a customer node 612) to another node in the CHG 600 corresponding to a particular situational context (a moment node 604) to determine that the user 5 is in the situational context corresponding to the node that is reached (e.g., "cooking") during the node traversal (or "walking") process.

At a step 118 of the process 112, the autonomous action manager 140 may determine second data corresponding to previous interactions associated with one or more of a plurality of user profiles different from the first user profile. As explained below, for example, the CHG 600 (shown in FIG. 6) may include customer nodes 610, 612 and 614 for multiple customers, as well as various edges that connect different customer nodes, either directly or indirectly, to common nodes corresponding to other entities, e.g., the song node 616 or the album node 626, and/or directly interconnect respective customer nodes. The second data may thus correspond, for example, to edges in the CHG 600 that are connected to customer node(s) other than the customer node corresponding to the user 5.

At a step 120 of the process 112, the autonomous action manager 140 may determine a plurality of previously executed actions associated with the first situational context. For example, in some implementations, the graph path reasoner 434 of the moment/action forecasting component 430 (shown in FIG. 4) may identify a plurality of nodes in the CHG 600 that correspond to actions that other users (such as those whose previous interactions are represented in the second data of step 118) have performed in the first situation context. Such actions may represent actions that can possibly be taken on behalf of the user 5, e.g., by playing music from a particular genre (e.g., "jazz"), when the user 5 is determined to be in a particular situational context, e.g., a "relaxing" moment.

At a step 122 of the process 112, the autonomous action manager 140 may determine, using the second data (e.g., corresponding to previous interactions of other users with entities represented in the CHG 600), a first action of the plurality of the previously executed actions to be executed. For example, as also described in more detail below, after the GNN of the graph path reasoner 434 reaches a moment node of the CHG 600 (e.g., the moment node 604), the GNN 160 may walk to another node of the CHG 600 corresponding to an action that can be performed on behalf of the user 5 (e.g., the genre node 628). When the GNN 160 is trained using a CHG 600 in which cross-user affinities can be inferred, the "action" node to which the GNN 160 walks may be determined, at least in part, using the second data (e.g., corresponding to previous interactions of other users with entities represented in the CHG 600). In some implementations, the step 122 may also use information about the first user for example the first data, user preference data, user history data, and/or other data associated with the first user.

At a step 123 of the process 112, the autonomous action manager 140 may determine a confidence that the first action is to be executed with respect to the first user. This may involve determining scores determined by the graph path reasoner 434 as a result of traversal of the graph and determining how strongly the user node corresponds to the action node based on the available data (e.g., first data received in step 114), data related to the user, weights of the graph, etc. Determination of the confidence may also involve operations of the policy network as described below in reference to FIG. 13.

If the confidence of the first action relative to the first user is high (123: High), for example above a threshold or otherwise satisfying a certain condition, at a step 124 of the process 112, the autonomous action manager 140 may cause a device (e.g., the device 110) corresponding to the first user profile (e.g., the profile of the user 5) to take the first action, e.g., to play songs corresponding to the action node (e.g., the genre node 628) that was reached during the walking process performed by the GNN 160 of the graph path reasoner 434. For example, in some implementations, an autonomous execution control component 440 of the autonomous action manager 140 may send an instruction to the domain manager component(s) 130 to take the determined action with respect to the profile of the user 5, thus causing the domain service(s) to cause a device corresponding to that profile (e.g., the device 110) to take that action (e.g., to play music from the genre corresponding to the genre node 628).

If the confidence of the first action relative to the first user is low (123: Low), for example below a threshold or otherwise satisfying a different condition, at a step 126 of the process 112, the autonomous action manager 140 may refrain from causing a device (e.g., the device 110) corresponding to the first user profile (e.g., the profile of the user 5) to take the first action.

If the confidence of the first action relative to the first user is neither high nor low (123: Medium), for example within a particular range or otherwise satisfying some other condition, the autonomous action manager 140 may initiate an exchange (shown in step 128) with a device (e.g., the device 110) corresponding to the first user profile (e.g., the profile of the user 5) to obtain confirmation to execute the first action. For example, the autonomous action manager 140 system may instruct the domain manager component(s) 130 to cause the device 110 to output data requesting user input with regard to the first action. For example, the domain manager component(s) 130 may cause the device 110 to output a first message to the user (either as audio, a message on a display, etc.) whether the system should execute the first action. The user may respond with a responsive input to the device 110. The resulting input data may indicate that the system 100 either is to take the first action or is not to take the first action. If the input data indicates that the first user has confirmed that the first action is to be executed, the autonomous action manager 140 may cause the device 110 to take the first action, ala step 124. If the input data indicates that the first user has indicated that the first action is not to be executed the autonomous action manager 140 may refrain from causing the device 110 to take the first action, ala step 126.

FIG. 1B shows a second example process 150 that may be performed by the autonomous action manager 140 in accordance with some embodiments. As shown, at a step 152 of the process 150, the autonomous action manager 140 may receive first data representing at least one current contextual state of a first user corresponding to a first user profile. For example, as explained in more detail below in connection with FIG. 4, the domain manager component(s) 130 may maintain a profile corresponding to the user 5, and a data ingestion component 410 of the autonomous action manager 140 may receive any of a number of types of data representing a current contextual state of the user 5, such as the current time of day, the current day of the week, an identifier of the device 110 being operated by the user 5, the current location of the user 5 (e.g., at home, in a car, at work, etc.), the most recent utterance of the user 5, the most recent NLU intent determined for the user 5, the current operational state the device 110 (e.g., playing music, running a timer, idle), etc.

At a step 154 of the process 150, the autonomous action manager 140 may determine, using the first data and a graph neural network (GNN) 160 that has been trained using graph data representing a graph, that the first user is in a first situational context corresponding to a first one of a plurality of first nodes in the graph. As indicated, the plurality of first nodes may correspond to respective ones of a plurality of possible situational contexts, and the graph may further include a second node corresponding to the first user and a first edge connected to the second node. As also indicated, second data representing a prior contextual state of the first user may additionally be associated with the first edge. As explained in more detail below in connection with FIGS. 4-13, for example, in some implementations, a graph path reasoner 434 of the moment/action forecasting component 430 (shown in FIG. 4) may include a GNN (e.g., GNN 160 illustrated in FIGS. 1A-1B) that is trained using a customer habitual graph (CHG) 600 (shown in FIG. 6), so as to enable the GNN to process a feature vector representing the received contextual data to traverse (or "walk") from one node in the CHG 600 corresponding to the user 5 (e.g., a customer node 612) to another node in the CHG 600 corresponding to a particular situational context (a moment node 604) to determine that the user 5 is in the situational context corresponding to the node that is reached (e.g., "cooking") during the node traversal (or "walking") process.

At a step 156 of the process 150, the autonomous action manager 140 may, based at least in part on the first user (e.g., the user 5) being in the first situational context (e.g., "cooking"), determine a first action (e.g., to play country music) of a plurality of possible actions to be executed with respect to the first user profile. For example, as also described in more detail below, after the GNN of the graph path reasoner 434 reaches a moment node of the CHG 600 (e.g., the moment node 604), the GNN 160 may walk to another node of the CHG 600 corresponding to an action that can be performed on behalf of the user 5 (e.g., the genre node 628).

At a step 158 of the process 150, the autonomous action manager 140 may cause a device (e.g., the device 110) corresponding to the first user profile (e.g., the profile of the user 5) to take the first action, e.g., to play music corresponding to the action node (e.g., the genre node 628) that was reached during the walking process performed by the GNN 160 of the graph path reasoner 434. For example, in some implementations, an autonomous execution control component 440 of the autonomous action manager 140 may send an instruction to the domain manager component(s) 130 to take the determined action with respect to the profile of the user 5, thus causing the domain service(s) to cause a device corresponding to that profile (e.g., the device 110) to take that action (e.g., to play music from the genre corresponding to the genre node 628).

In certain instances, the action selected by the system 100 to perform (such as that selected in FIG. 1A or 1B) may correspond to a same action as taken by some other user in the same situational context, for example, playing jazz music in a situational context that corresponds to "relaxing." In certain instances, the action may be similar but with slight differences. For example, a group of previous users may have, in a situational context that corresponds to "relaxing," played jazz from Artist A or Artist B or from Music Service A or Music Service B. The previous interactions of that group of previous users may have been used to train the system (e.g., determine aspects of the graph/GNN). However for a specific other user at runtime (for example user 5 illustrated in FIGS. 1A and 1B), the decided upon action may, depending on various factors (such as the previous behavior of user 5, the preferences of user 5, the installed skills/applications of user 5, or the like) the system may determine that the first action to be performed in response to the user 5 being associated with the first situational context should be playing jazz (or other music) by Artist C from Music Service C. Thus, the action determined by the system 100 may have slight differences from the actions performed as a result of previous interactions with the other users.

Although the figures and discussion of the present disclosure illustrate certain steps in a particular order, the steps described may be performed in a different order (as well as certain steps removed or added) without departing from the present disclosure.

Figure 2:
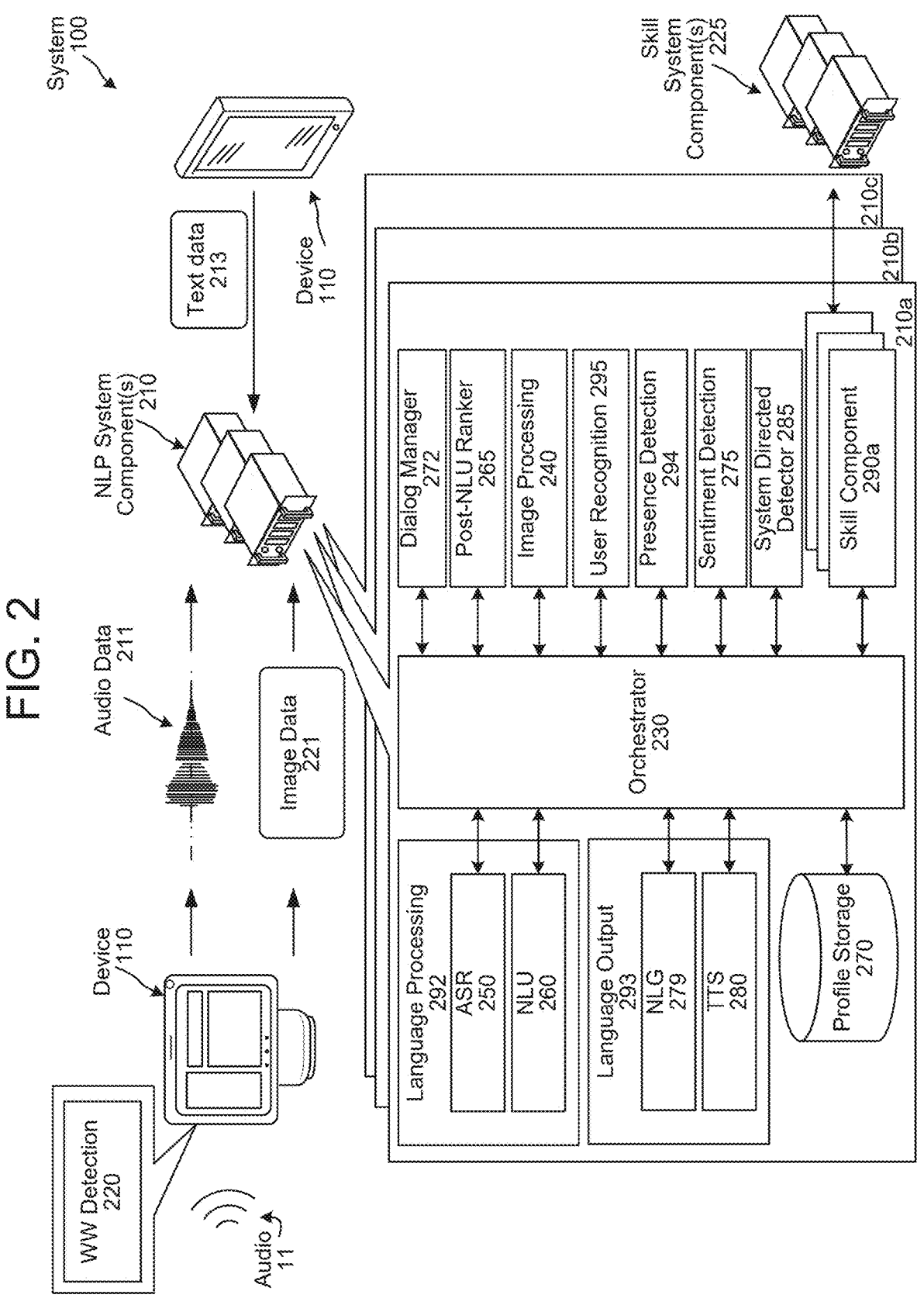
FIG. 2 is a conceptual diagram of certain components of the system shown in FIGS. 1A-B, according to embodiments of the present disclosure.

In some implementations, virtual assistant system 100 may operate using various components shown in FIG. 2. For example, as noted above, in some implementations, the domain manager component(s) 130 and/or the autonomous action manager 140 shown in FIGS. 1A-1B may be implemented using one or more of the natural language processing (NLP) system component(s) 210 and/or skill system component(s) 225 shown in FIG. 2. The various components may be located on same or different physical devices.

Figure 14:
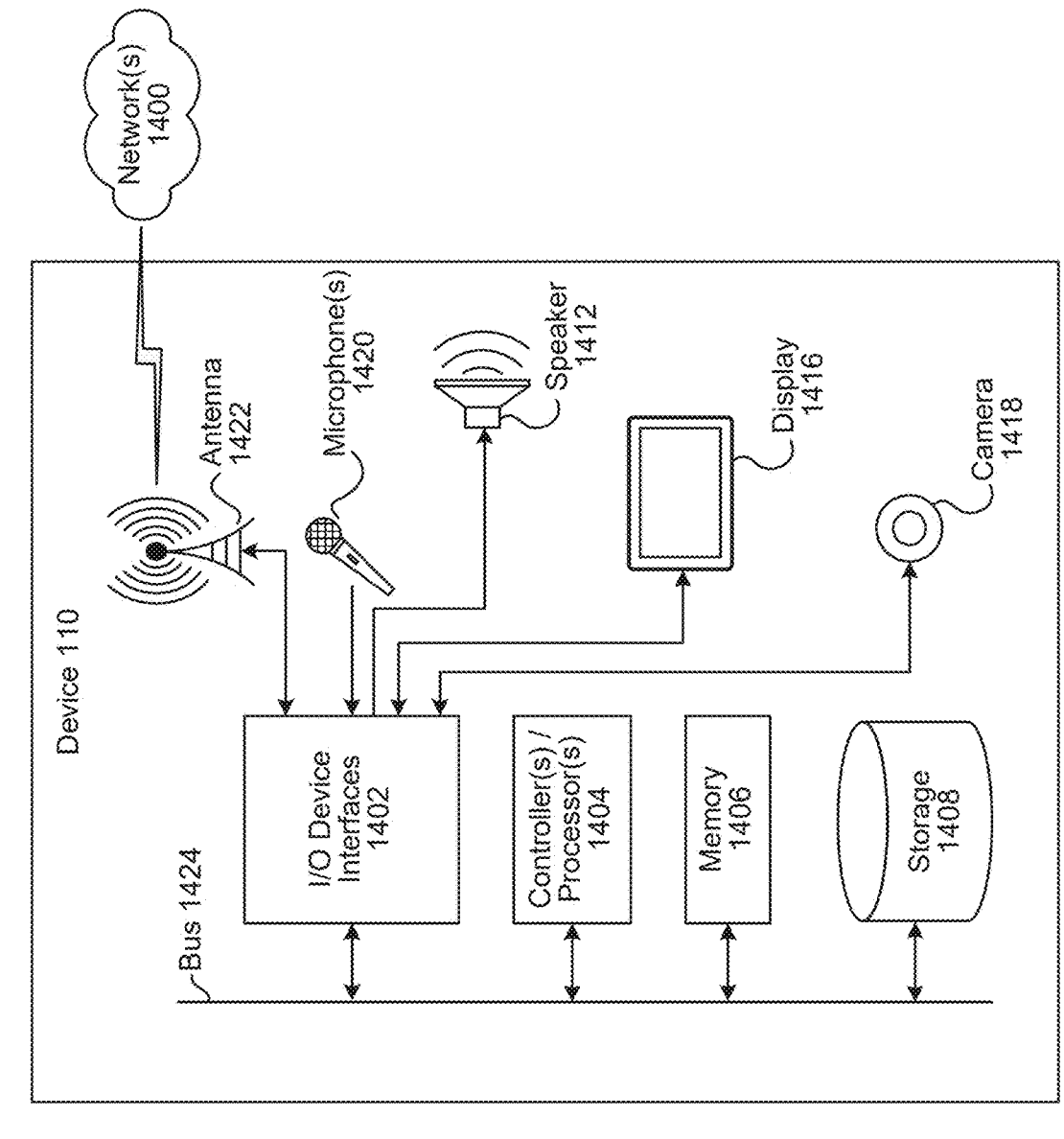
FIG. 14 is a block diagram conceptually illustrating example components of a device, according to embodiments of the present disclosure.
Figure 16:
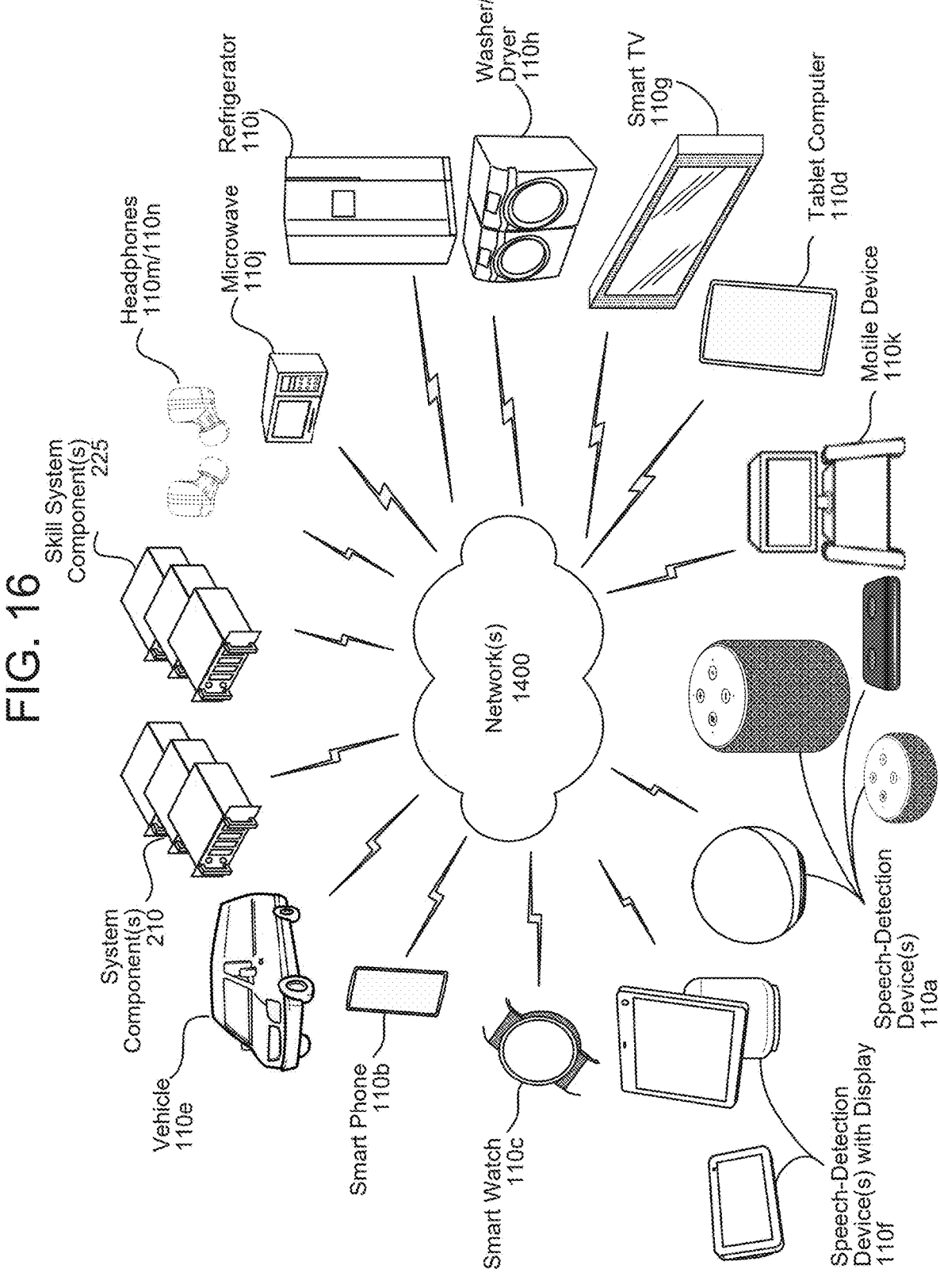
FIG. 16 illustrates an example of a computer network for use with the overall system, according to embodiments of the present disclosure.

Communication between various components may occur directly or across one or more network(s) 1400 (shown in FIGS. 14-16). The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/NLP system component(s) 210. In at least some embodiments, such determination may be made using a wakeword detection component 220. The wakeword detection component 220 may be configured to detect various wakewords.

In at least some examples, each wakeword may correspond to a name of a different digital assistant. An example wakeword/digital assistant name is "Alexa." In another example, input to the system may be in form of text data 213, for example as a result of a user typing an input into a user interface of device 110. Other input forms may include indication that the user has pressed a physical or virtual button on device 110, the user has made a gesture, etc. The device 110 may also capture images using camera(s) of the device 110 and may send image data 221 representing those image(s) to the NLP system component(s) 210. The image data 221 may include raw image data or image data processed by the device 110 before sending to the NLP system component(s) 210. The image data 221 may be used in various manners by different components of the system to perform operations such as determining whether a user is directing an utterance to the system, interpreting a user command, responding to a user command, etc.

The wakeword detection component 220 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 220 and/or input is detected by an input detector, the device 110 may "wake" and begin transmitting audio data 211, representing the audio 11, to the system component(s) 210. The audio data 211 may include data corresponding to the wakeword; in other embodiments, the portion of the audio corresponding to the wakeword is removed by the device 110 prior to sending the audio data 211 to the system component(s) 210. In the case of touch input detection or gesture based input detection, the audio data may not include a wakeword.

In some implementations, the virtual assistant system 100 may include more than one NLP system component(s) 210. The system component(s) 210 may respond to different wakewords and/or perform different categories of tasks. Each NLP system 210_a_, 210_b_, 210_c_ may be associated with its own wakeword such that speaking a certain wakeword results in audio data be sent to and processed by a particular system. For example, detection of the wakeword "Alexa" by the wakeword detection component 220 may result in sending audio data to NLP system 210_a_ for processing while detection of the wakeword "Computer" by the wakeword detection component 220 may result in sending audio data to NLP system 210_b_ for processing. The system may have a separate wakeword and system for different skills/systems (e.g., "Dungeon Master" for a game play skill/NLP system 210_c_) and/or such skills/systems may be coordinated by one or more skill component(s) 290 of one or more system component(s) 210.

The device 110 may also include a system directed input detector 385. (The NLP system component(s) 210 may also include a system directed input detector 285 which may operate in a manner similar to system directed input detector 385.) The system directed input detector 385 may be configured to determine whether an input to the system (for example speech, a gesture, etc.) is directed to the system or not directed to the system (for example directed to another user, etc.). The system directed input detector 385 may work in conjunction with the wakeword detection component 220. If the system directed input detector 385 determines an input is directed to the system, the device 110 may "wake" and begin sending captured data for further processing (for example, processing audio data using the language processing component 292/392, processing captured image data using image processing component 240/340 or the like). If data is being processed the device 110 may indicate such to the user, for example by activating or changing the color of an illuminated output (such as a light emitting diode (LED)

ring), displaying an indicator on a display (such as a light bar across the display), outputting an audio indicator (such as a beep) or otherwise informing a user that input data is being processed. If the system directed input detector 385 determines an input is not directed to the system (such as a speech or gesture directed to another user) the device 110 may discard the data and take no further action for processing purposes. In this way the virtual assistant system 100 may prevent processing of data not directed to the system, thus protecting user privacy. As an indicator to the user, however, the system may output an audio, visual, or other indicator when the system directed input detector 385 is determining whether an input is potentially device directed. For example, the system may output an orange indicator while considering an input, and may output a green indicator if a system directed input is detected. Other such configurations are possible.

Upon receipt by the system component(s) 210, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 211 to a language processing component 292. The language processing component 292 (sometimes also referred to as a spoken language understanding (SLU) component) includes an automatic speech recognition (ASR) component 250 and a natural language understanding (NLU) component 260. The ASR component 250 may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein.

The language processing component 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system component(s) 210, a skill component 290, a skill system component(s) 225, etc.) to execute the intent. For example, if the text data corresponds to "play the 5$^{th}$ Symphony by Beethoven," the NLU component 260 may determine an intent that the system output music and may identify "Beethoven" as an artist/composer and "5$^{th}$ Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora such as "this song" or "my next appointment"—the language processing component 292 can send a decode request to another language processing component 292 for information regarding the entity mention and/or other context related to the utterance. The language processing component 292 may augment, correct, or base results data upon the audio data 211 as well as any data received from the other language processing component 292.

The NLU component 260 may return NLU results data (which may include tagged text data, indicators of intent, etc.) back to the orchestrator component 230. The orchestrator component 230 may forward the NLU results data to a skill component(s) 290. If the NLU results data includes a single NLU hypothesis, the NLU component 260 and the orchestrator component 230 may direct the NLU results data to the skill component(s) 290 associated with the NLU hypothesis. If the NLU results data includes an N-best list of NLU hypotheses, the NLU component 260 and the orchestrator component 230 may direct the top scoring NLU hypothesis to a skill component(s) 290 associated with the top scoring NLU hypothesis. The system may also include a post-NLU ranker 265 which may incorporate other information to rank potential interpretations determined by the NLU component 260. The local device 110 may also include its own post-NLU ranker 365, which may operate similarly to the post-NLU ranker 265.

A skill component may be software running on the system component(s) 210 that is akin to a software application. That is, a skill component 290 may enable the system component(s) 210 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 210 may be configured with more than one skill component 290. For example, a weather service skill component may enable the system component(s) 210 to provide weather information, a car service skill component may enable the system component(s) 210 to book a trip with respect to a taxi or ride sharing service, a restaurant skill component may enable the system component(s) 210 to order a pizza with respect to the restaurant's online ordering system, etc. A skill component 290 may operate in conjunction between the system component(s) 210 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system component(s) 225 may communicate with a skill component(s) 290 within the system component(s) 210 and/or directly with the orchestrator component 230 or with other components. A skill system component(s) 225 may be configured to perform one or more actions. An ability to perform such action(s) may sometimes be referred to as a "skill." That is, a skill may enable a skill system component 225 to execute specific functionality in order to provide data or perform some other action requested by a user. For example, a weather service skill may enable a skill system component 225 to provide weather information to the system component(s) 210, a car service skill may enable a skill system component 225 to book a trip with respect to a taxi or ride sharing service, an order pizza skill may enable a skill system component 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 210 may be configured with a skill component 290 dedicated to interacting with the skill system component(s) 225. Unless expressly stated otherwise, reference to a skill, skill device, or skill component may include a skill component 290 operated by the system component(s) 210 and/or skill operated by the skill system component(s) 225. Moreover, the functionality described herein as a skill or skill may be referred to using many different terms, such as an action, bot, app, or the like. The skill component 290 and or skill system component(s) 225 may return output data to the orchestrator component 230.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) 210 may include a dialog manager component 272 that manages and/or tracks a dialog between a user and a device. As used herein, a "dialog" may refer to data transmissions (such as relating to multiple user inputs and system outputs) between the virtual assistant system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall virtual assistant system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the virtual assistant system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 272 may associate a dialog session identifier with the dialog upon identifying that the user is engaging in a dialog with the user. The dialog manager component 272 may track a user input and the corresponding system generated response to the user input as a turn. The dialog session identifier may correspond to multiple turns of user input and corresponding system generated response. The dialog manager component 272 may transmit data identified by the dialog session identifier directly to the orchestrator component 230 or other component. Depending on system configuration the dialog manager component 272 may determine the appropriate system generated response to give to a particular utterance or user input of a turn. Or creation of the system generated response may be managed by another component of the system (e.g., the language output component 293, NLG 279, orchestrator component 230, etc.) while the dialog manager component 272 selects the appropriate responses. Alternatively, another component of the system component(s) 210 may select responses using techniques discussed herein. The text of a system generated response may be sent to a TTS component 280 for creation of audio data corresponding to the response. The audio data may then be sent to a user device (e.g., device 110) for ultimate output to the user. Alternatively (or in addition) a dialog response may be returned in text or some other form.

The dialog manager component 272 may receive the ASR hypothesis/hypotheses (i.e., text data) and make a semantic interpretation of the phrase(s) or statement(s) represented therein. That is, the dialog manager component 272 determines one or more meanings associated with the phrase(s) or statement(s) represented in the text data based on words represented in the text data. The dialog manager component 272 determines a goal corresponding to an action that a user desires be performed as well as pieces of the text data that allow a device (e.g., the device 110, the system component(s) 210, a skill component 290, a skill system component 225, etc.) to execute the intent. If, for example, the text data corresponds to "what is the weather," the dialog manager component 272 may determine that that the system component(s) 210 is to output weather information associated with a geographic location of the device 110. In another example, if the text data corresponds to "turn off the lights," the dialog manager component 272 may determine that the system component(s) 210 is to turn off lights associated with the device(s) 110 or the user(s) 5.

The dialog manager component 272 may send the results data to one or more skill component(s) 290. If the results data includes a single hypothesis, the orchestrator component 230 may send the results data to the component(s) 290 associated with the hypothesis. If the results data includes an N-best list of hypotheses, the orchestrator component 230 may send the top scoring hypothesis to one or more skill components 290 associated with the top scoring hypothesis.

The NLP system component(s) 210 may include a language output component 293. The language output component 293 includes a natural language generation (NLG) component 279 and a text-to-speech (TTS) component 280. The NLG component 279 can generate text for purposes of TTS output to a user. For example, the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280. Alternatively or in addition, the TTS component 280 may receive text data from a skill component 290 or other system component for output.

The NLG component 279 may include a trained model. The NLG component 279 generates text data from dialog data received by the dialog manager component 272 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 290, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 210 as image data. The device 110 may further include circuitry for voice command-based control of the camera, allowing a user 5 to request capture of image or video data. The device 110 may process the commands locally or send audio data 211 representing the commands to the system component(s) 210 for processing, after which the system component(s) 210 may return output data that can cause the device 110 to engage its camera.

Upon receipt by the system component(s) 210, the image data 221 may be sent to an orchestrator component 230. The orchestrator component 230 may send the image data 221 to an image processing component 240. The image processing component 240 can perform computer vision functions such as object recognition, modeling, reconstruction, etc. For example, the image processing component 240 may detect a person, face, etc. (which may then be identified using user recognition component 295). The device may also include an image processing component 340 which operates similarly to image processing component 240.

In some implementations, the image processing component 240 can detect the presence of text in an image. In such implementations, the image processing component 240 can recognize the presence of text, convert the image data to text data, and send the resulting text data via the orchestrator component 230 to the language processing component 292 for processing by the NLU component 260.

The system component(s) 210 may include a user recognition component 295 that recognizes one or more users using a variety of data. However, the disclosure is not limited thereto, and the device 110 may include a user recognition component 395 instead of and/or in addition to user recognition component 295 of the system component(s) 210 without departing from the disclosure. User recognition component 395 operates similarly to user recognition component 295.

The user recognition component 295 may take as input the audio data 211 and/or text data output by the ASR component 250. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users assuming user permission and previous authorization. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art.

The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations.

Output of the user recognition component 295 may include a single user identifier corresponding to the most likely user that originated the user input. Alternatively, output of the user recognition component 295 may include an N-best list of user identifiers with respective scores indicating likelihoods of respective users originating the user input. The output of the user recognition component 295 may be used to inform NLU processing as well as processing performed by other components of the system.

The system component(s) 210/device 110 may include a presence detection component 294/394 that determines the presence and/or location of one or more users using a variety of data.

The virtual assistant system 100 (either on device 110, the NLP system component(s) 210, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 210 with permission to allow the skill to execute with respect to the user's natural language user inputs. If a user does not enable a skill, the NLP system component(s) 210 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 210 may also include a sentiment detection component 275 that may be configured to detect a sentiment of a user from audio data representing speech/utterances from the user, image data representing an image of the user, and/or the like. The sentiment detection component 275 may be included in system component(s) 210, as illustrated in FIG. 2, although the disclosure is not limited thereto and the sentiment detection component 275 may be included in other components without departing from the disclosure. For example the sentiment detection component 375 may be included in the device 110, as a separate component, etc. Sentiment detection component 375 may operate similarly to sentiment detection component 275. The NLP system component(s) 210 may use the sentiment detection component 275 to, for example, customize a response for a user based on an indication that the user is happy or frustrated.

Figure 3:
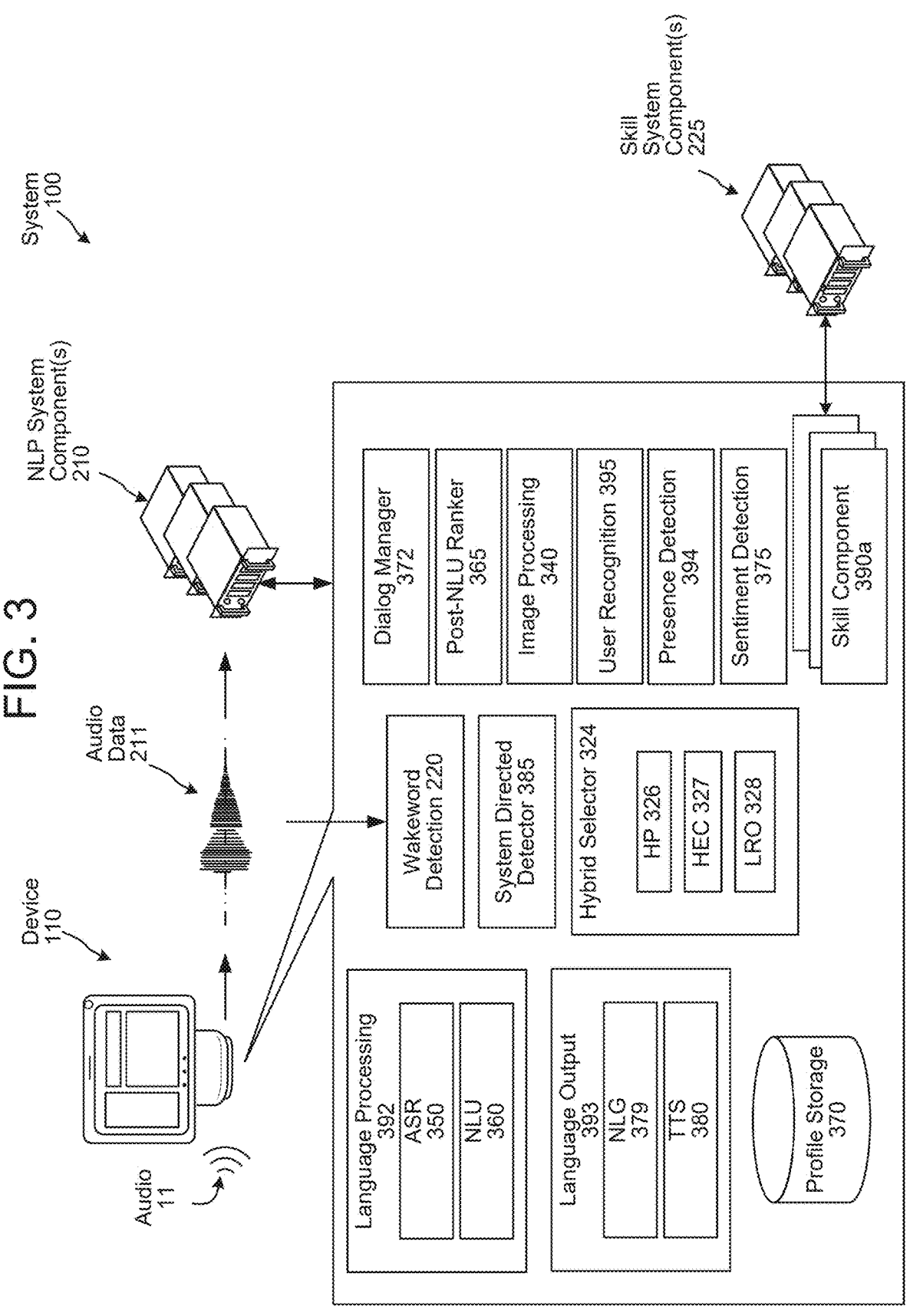
FIG. 3 is a conceptual diagram illustrating components that may be included in the device shown in FIGS. 1A and 1B, according to embodiments of the present disclosure.

Although the components of FIG. 2 may be illustrated as part of system component(s) 210, device 110, or otherwise, the components may be arranged in other device(s) (such as in device 110 if illustrated in system component(s) 210 or vice-versa, or in other device(s) altogether) without departing from the disclosure. FIG. 3 illustrates such a configured device 110.

In at least some embodiments, the NLP system component(s) 210 may receive the audio data 211 from the device 110, to recognize speech corresponding to a spoken input in the received audio data 211, and to perform functions in response to the recognized speech. In at least some embodiments, these functions involve sending directives (e.g., commands), from the NLP system component(s) 210 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the NLP system component(s) 210 over the network(s) 1400, some or all of the functions capable of being performed by the NLP system component(s) 210 may be performed by sending one or more directives over the network(s) 1400 to the device 110, which, in turn, may process the directive(s) and perform one or more corresponding actions. For example, the NLP system component(s) 210, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the NLP system component(s) 210 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the NLP system component(s) 210 and/or the ASR component 350. The wakeword detection component 220 may also send an indication, to the hybrid selector 324, representing a wakeword was not detected. In response to receiving such an indication, the hybrid selector 324 may refrain from sending the audio data 211 to the NLP system component(s) 210, and may prevent the ASR component 350 from further processing the audio data 211. In this situation, the audio data 211 can be discarded.

The device 110 may conduct its own speech processing using on-device language processing components, such as an SLU/language processing component 392 (which may include an ASR component 350 and an NLU 360), similar to the manner discussed herein with respect to the language processing component 292 (or ASR component 250 and the NLU component 260) of the NLP system component(s) 210. Language processing component 392 may operate similarly to language processing component 292, ASR component 350 may operate similarly to ASR component 250 and NLU component 360 may operate similarly to NLU component 260. The device 110 may also internally include, or otherwise have access to, other components such as one or more skill components 390 capable of executing commands based on NLU output data or other results determined by the device 110/NLP system component(s) 210 (which may operate similarly to skill components 290), a user recognition component 395 (configured to process in a similar manner to that discussed herein with respect to the user recognition component 295 of the NLP system component(s) 210), profile storage 370 (configured to store similar profile data to that discussed herein with respect to the profile storage 270 of the NLP system component(s) 210), or other components. In at least some embodiments, the profile storage 370 may only store profile data for a user or group of users specifically associated with the device 110. Similar to as described above with respect to skill component 290, a skill component 390 may communicate with a skill system component(s) 225. The device 110 may also have its own language output component 393 which may include NLG component 379 and TTS component 380. Language output component 393 may operate similarly to language processing component 293, NLG component 379 may operate similarly to NLG component 279 and TTS component 380 may operate similarly to TTS component 280.

In at least some embodiments, the on-device language processing components may not have the same capabilities as the language processing components of the NLP system component(s) 210. For example, the on-device language processing components may be configured to handle only a subset of the natural language user inputs that may be handled by the NLP system component(s) 210. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the NLP system component(s) 210. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the NLP system component(s) 210.

The hybrid selector 324, of the device 110, may include a hybrid proxy (HP) 326 configured to proxy traffic to/from the NLP system component(s) 210. For example, the HP 326 may be configured to send messages to/from a hybrid execution controller (HEC) 327 of the hybrid selector 324. For example, command/directive data received from the NLP system component(s) 210 can be sent to the HEC 327 using the HP 326. The HP 326 may also be configured to allow the audio data 211 to pass to the NLP system component(s) 210 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of local language processing when new audio data 211 becomes available. In general, the hybrid selector 324 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the NLP system component(s) 210 and chooses to use that remotely-determined directive data.

Thus, when the audio data 211 is received, the HP 326 may allow the audio data 211 to pass through to the NLP system component(s) 210 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the NLP system component(s) 210 or the local language processing components. However, the disclosure is not limited thereto, and in some examples the hybrid selector 324 may send the audio data 211 only to the local ASR component 350 without departing from the disclosure. For example, the device 110 may process the audio data 211 locally without sending the audio data 211 to the NLP system component(s) 210.

The local ASR component 350 is configured to receive the audio data 211 from the hybrid selector 324, and to recognize speech in the audio data 211, and the local NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the NLP system component(s) 210. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax.

This may include formatting the directive using JSON. In at least some embodiments, a device-determined directive may be serialized, much like how remotely-determined directives may be serialized for transmission in data packets over the network(s) 1400. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledgebase information, internet search results, and/or local directive data) to the hybrid selector 324, such as a "ReadyToExecute" response. The hybrid selector 324 may then determine whether to use directive data from the on-device components to respond to the natural language user input, to use directive data received from the NLP system component(s) 210, assuming a remote response is even received (e.g., when the device 110 is able to access the NLP system component(s) 210 over the network(s) 1400), or to determine output audio requesting additional information from the user 5.

The device 110 and/or the NLP system component(s) 210 may associate a unique identifier with each natural language user input. The device 110 may include the unique identifier when sending the audio data 211 to the NLP system component(s) 210, and the response data from the NLP system component(s) 210 may include the unique identifier to identify which natural language user input the response data corresponds.

In at least some embodiments, the device 110 may include, or be configured to use, one or more skill components 390 that may work similarly to the skill component(s) 290 implemented by the NLP system component(s) 210. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill system component(s) 225. For example, a skill system component(s) 225 may be located in a remote environment (e.g., separate location) such that the device 110 may only communicate with the skill system component(s) 225 via the network(s) 1400. However, the disclosure is not limited thereto. For example, in at least some embodiments, a skill system component(s) 225 may be configured in a local environment (e.g., home server and/or the like) such that the device 110 may communicate with the skill system component(s) 225 via a private network, such as a local area network (LAN).

As used herein, a "skill" may refer to a skill component 390, a skill system component(s) 225, or a combination of a skill component 390 and a corresponding skill system component(s) 225.

Similar to the manner discussed with regard to FIG. 2, the local device 110 may be configured to recognize multiple different wakewords and/or perform different categories of tasks depending on the wakeword. Such different wakewords may invoke different processing components of local device 110 (not illustrated in FIG. 3). For example, detection of the wakeword "Alexa" by the wakeword detection component 220 may result in sending audio data to certain language processing components 392/skills 390 for processing while detection of the wakeword "Computer" by the wakeword detection component 220 may result in sending audio data different language processing components 392/skills 390 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 4:
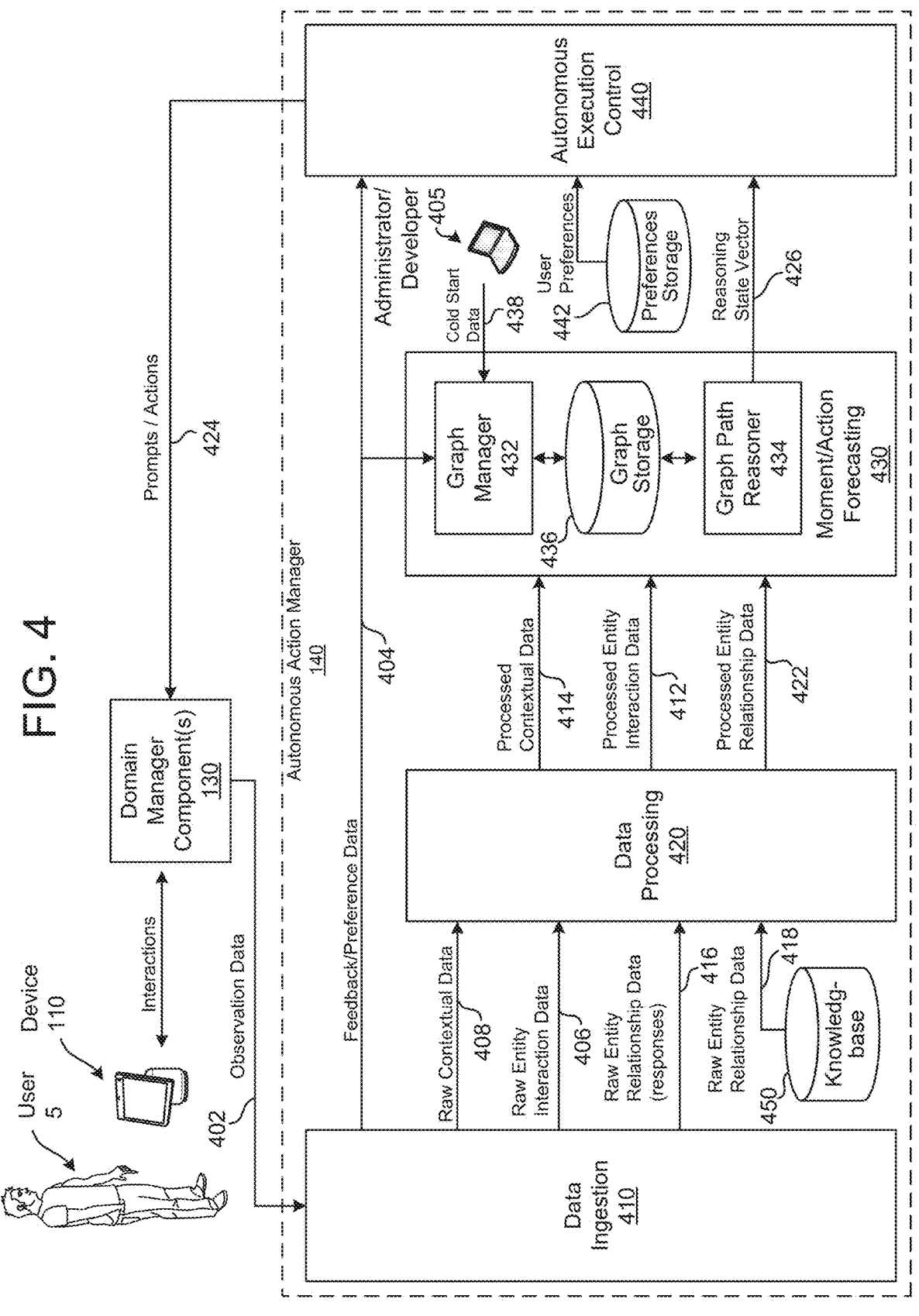
FIG. 4 is a conceptual diagram illustrating example components of the autonomous action manager shown in FIGS. 1A and 1B, according to embodiments of the present disclosure.

FIG. 4 shows an example embodiment of the autonomous action manager 140 shown in FIGS. 1A-1B. As illustrated, in some implementations, the autonomous action manager 140 may include a data ingestion component 410, a data processing component 420, a moment action/forecasting component 430, and an autonomous execution control component 440, as well as a knowledgebase 450 that can be accessed by the data processing component 420 and a preferences storage 442 that can be accessed by the autonomous execution control component 440, as described in more detail below. Further, as additionally shown in FIG. 4, in some implementations, the moment/action forecasting component 430 may include a graph manager 432 and a graph path reasoner 434, as a well as a graph storage 436 that can be accessed by each of the graph manager 432 and the graph path reasoner 434 for purposes that will also be described below.

Referring to FIG. 4, the user 5 may operate one or more devices 110 to interact with the domain manager component(s) 130 (e.g., as described above in connection with FIGS. 2 and 3) to receive the benefit of various services, such as listening to music, controlling a home automation service, ordering products for delivery, etc. Data and signals relating to such interactions may be collected and stored at least temporarily within the domain manager component(s) 130, e.g., in association with a profile corresponding to the user 5. As indicated by an arrow 402 in FIG. 4, the data ingestion component 410 may receive such data and signals (which are referred to herein as "observation data") from the domain manager component(s) 130. At least some of the received observation data may be associated with the profile corresponding to the user 5, and may, among other things, represent at least some subset of the interactions between the user 5 and the domain manager component(s) 130. As explained in more detail below, interaction data representing the manner in which the user 5 interacted with particular entities within respective domains (e.g., a "music" domain, a "video" domain, or a "kitchen" domain) may be particularly useful to the autonomous action manager 140. For a music domain, for instance, the observation data received by the data ingestion component 410 may include interaction data representing interactions between the user 5 and one or more songs, albums, and/or genres, and may further include contextual data (e.g., current time, current location, an identifier of the device 110 in operation, session dialog history, etc.) representing the contextual circumstances that existed at the times such interactions occurred. As one example, the observation data could reflect that the user 5 uttered the request "play the fifth" while wearing Echo Buds at 11:00 PM in the user's home, and may further indicate that an NLU system determined that the intent of that utterance was to play the piece of music "Beethoven's Fifth Symphony." As explained further below, such entity interaction data may be processed by the data processing component 420 and used by the graph manager 432 of the moment/action forecasting component 430 to generate at least a portion of a customer habitual graph (CHG) that can be used by a graph neural network (GNN) 160 of the graph path reasoner 434 to infer the existence of a moment and/or a suitable action to perform during that moment. Examples of customer habitual graphs that may be generated by the graph manager 432 for that purpose are described below in connection with FIGS. 5 and 6.

In some implementations, the observation data represented by the arrow 402 may also include data representing at least certain responses sent from the domain manager component(s) 130 to the device 110 in response to user queries. As explained in more detail below, such response data can be used to generate certain portions of a customer habitual graph (e.g., CHG 500 shown in FIG. 5) that represent relationships between entities, such as by indicating that the song "Song_name" was sung by the artist "Artist_name." For example, if a user uttered a query "who sings Song_name?," the response to that query (e.g., "The song Song_name is sung by Artist_name") could be used to identify that relationship in the CHG 500. An example process 800 for adding nodes and edges to the CHG 500 to represent such relationships is described below in connection with FIG. 8.

Further, in some implementations, the observation data represented by the arrow 402 may additionally include feedback received from the user 5 in response to prompts generated by the autonomous execution control component 440, such as a prompt requesting the user to confirm that the user 5 is exercising and/or that the user 5 would like to listen to hard rock music while the user 5 is exercising. As indicated by an arrow 404 in FIG. 4, in some implementations, in addition to being used by the autonomous execution control component 440 to determine whether to take a particular action, such feedback may be used to modify one or more portions of the CHG 500 to reflect the indicated preference. Additionally or alternatively, the observation data represented by the arrow 402 may include preference data input by the user 5, either in response to a prompt or independently, and the graph manager 432 may modify the CHG 500 to reflect the indicated preference. For example, in response to the user 5 tapping a "like" icon, or perhaps a "dislike" icon, when a given song is playing, the graph manager 432 may modify the graph to reflect the user's affinity, or perhaps distaste, for the song, such as by adding a "liked by," or perhaps "disliked by," edge between a node representing the user and a node representing the song. An example process 900 for modifying the CHG 500 in such a manner is described below in connection with FIG. 9.

Further, in addition to including data that can be used to generate the CHG 500, the observation data represented by the arrow 402 may include contextual data representing a current situational context of a user and/or the device 110, such as the current time of day, the current location of the device 110, an identifier of the device 110, the current location of the user 5 (e.g., at home, in a car, at work, etc.), the current operational state the device 110 (e.g., playing music, running a timer, idle), a most recent utterance by the user 5, etc. As explained in more detail below, such contextual data may be used by the autonomous action manager 140, at run time, to infer the existence of a moment and/or a suitable action to perform during that moment.

Example techniques that may be used by the graph manager 432 to build and maintain the CHG 500 that may be stored in the graph storage 436 and used by the graph path reasoner 434 to infer moments and/or corresponding actions for a user 5 during runtime, will now be described.

As indicated by an arrow 406 in FIG. 4, one type of observation data that the data ingestion component 410 may receive from the domain manager component(s) 130 and pass along to the data processing component 420 is raw entity interaction data. The raw entity interaction data may represent detected interactions between any of a number of possible entity types. With respect to the music domain, for example, entities for which such interaction data may be received may include "users," "utterances," "songs," "artists," "genres." Additionally, as indicated by an arrow 408 in FIG. 4, another type of observation data the data ingestion component 410 may receive from the domain manager component(s) 130 and/or independently determine, is raw contextual data. The raw contextual data may represent, for example, the time of day, the day of the week, the location of the device 110, the current location of the user 5 (e.g., at home, in a car, at work, etc.), the current operational state the device 110 (e.g., playing music, running a timer, idle), etc.

The data processing component 420 may filter and/or reformat and the raw entity interaction data received from the data ingestion component 410 to yield processed entity interaction data that, as indicated by an arrow 412, may be passed to the moment/action forecasting component 430. Such processed entity interaction data may include data representing a relevant subset of entities and the detected interactions amongst those entities. Using the above example, for instance, the processed entity interaction data may indicate that a user made the utterance "put on Song_name," and that the utterance corresponded to an intent to play the song Song_name by the artist Artist_name. The data processing component 420 may additionally filter and/or reformat the raw contextual data received from the data ingestion component 410 to yield processed contextual data that, as indicated by an arrow 414, may also be passed to the moment/action forecasting component 430. For example, in some implementations, contextual data identifying a time of day may be converted to one of twenty four possible values representing respective one hour intervals within a day.

Figure 7:
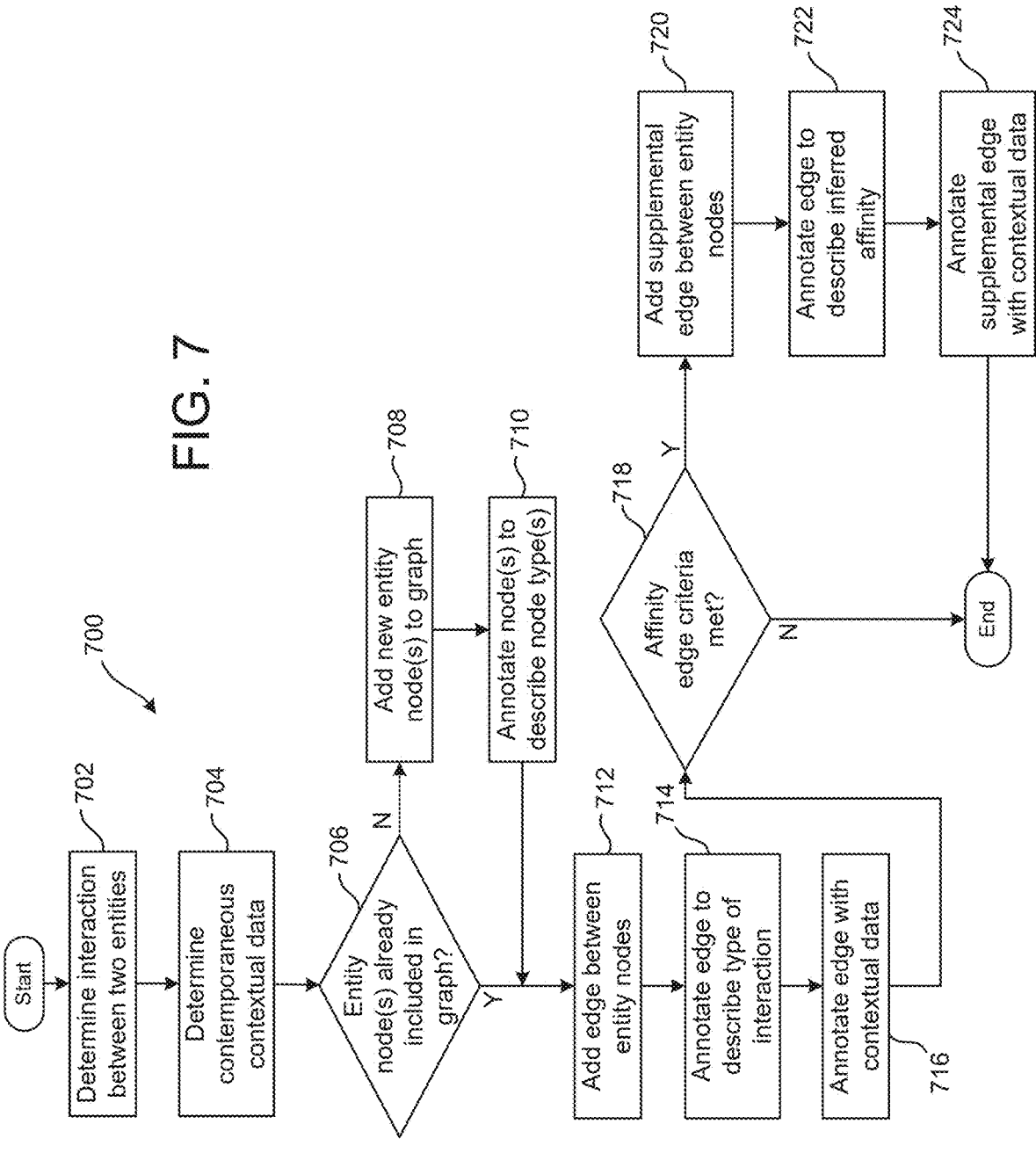
FIG. 7 is a flow diagram of a first example process for adding features to a customer habitual graph, according to embodiments of the present disclosure.

FIG. 7 shows an example process 700 that may be performed by the graph manager 432 to generate portions of the CHG 500 in response to receipt of processed entity interaction data from the data processing component 420. As shown, at a step 702 of the process 700, the graph manager 432 may determine that the processed entity interaction data represents an interaction between two entities, such as a customer (a first entity) speaking a particular utterance (a second entity), or a particular utterance (a first entity) representing an intent to play a song (a second entity).

At a step 704 of the process 700, the graph manager 432 may determine contemporaneous contextual data corresponding to the interaction determined at the step 702, such the time of day at which the interaction occurred.

At a decision 706 of the process 700, the graph manager 432 may determine whether the CHG 500 already includes nodes corresponding to the entities identified at the step 702.

Figure 5:
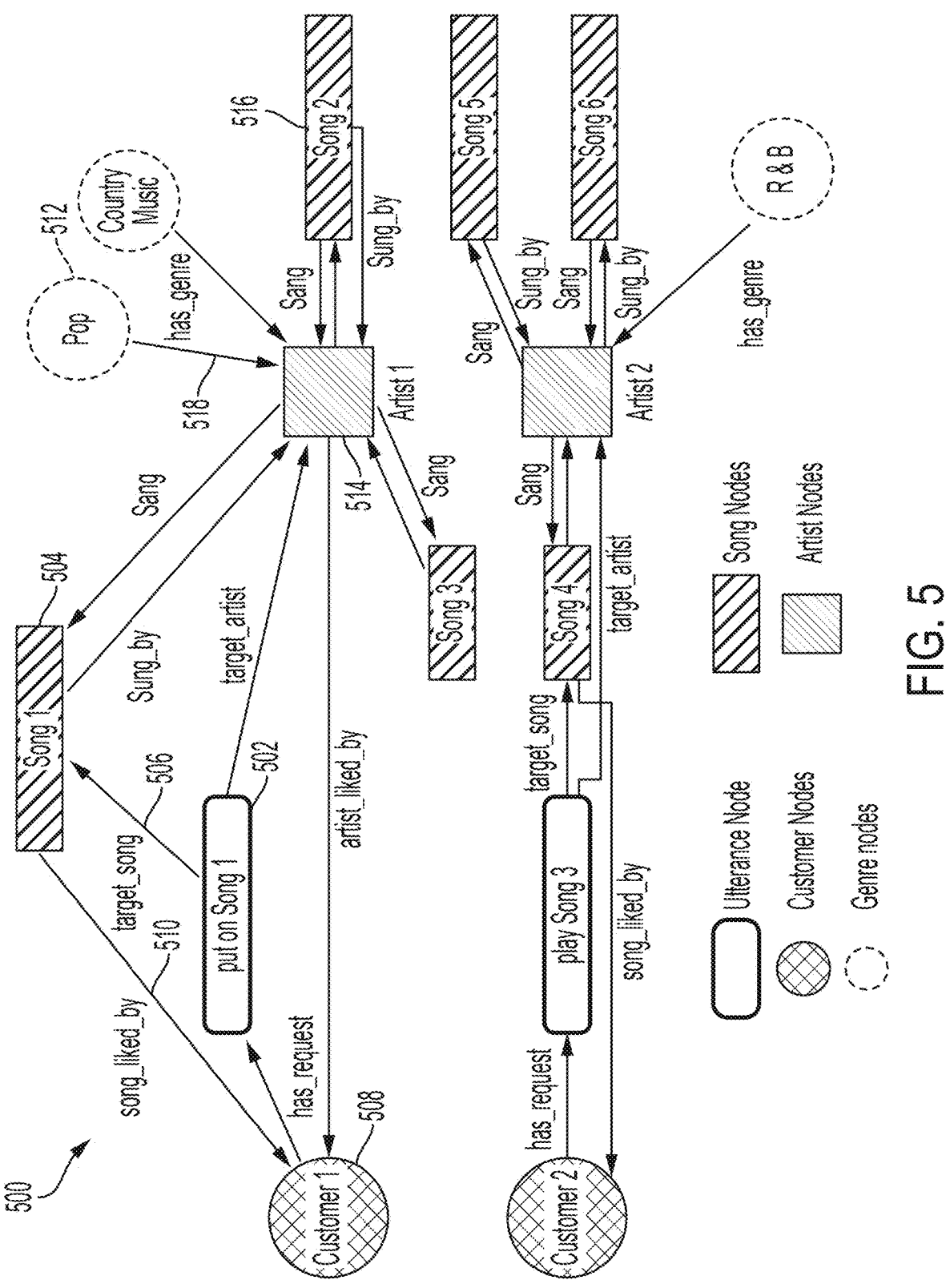
FIG. 5 shows an example customer habitual graph that may be generated by the graph manager shown in FIG. 4, according to embodiments of the present disclosure.

When, the graph manager 432 determines (per the decision 706) that the CHG 500 does not already include nodes for one or both of the identified entities, the process 700 may proceed to a step 708, at which the graph manager 432 may add new entity node(s) to the CHG 500. Referring to FIG. 5, for example, if the processed entity interaction data indicated that a user made the utterance "put on Song 1," and that the utterance corresponded to an intent to play the song "Song 1" by the artist "Artist 1", the graph manager 432 may, at the step 708, add one node 502 to the CHG 500 that represents the utterance "put on Song 1" and also add another node 504 to the CHG 500 that represents the song "Song 1."

At a step 710 of the process 700, the graph manager 432 may annotate the node(s) added at the step 708 to identify the types of entities they represent, and possibly the actions that can be performed (e.g., play music, place an order, etc.) when such nodes are reached during a graph walking process performed by the GNN 160 of the graph path reasoner 434. For example, the graph manager 432 may annotate the node 502 to indicate that it represents an "utterance" and may annotate the node 504 to indicate that it represents a "song" as well as to indicate that it corresponds to a "play music" action. Further, in some implementations, the nodes corresponding to actions that can be performed (e.g., the song node 504) may be further annotated to identify one or more particular processes and/or services that are to be used to perform the corresponding action (e.g., to indicate that the Amazon Music service is to be used to play "Song 1" when the song node 504 is reached during a graph walking process). For example, if the song node 504 was created in response to a request by the user 5 to play "Song 1" using Amazon Music, the song node 504 may be annotated in indicated that Amazon Music is to be used to play "Song 1" when the node 504 is reached during a subsequent graph walking process. Additionally or alternatively, as explained further below, in some implementations, one or more particular process(es) and/or service(s) that are to be used to perform actions when such "action" nodes are reached may be determined by the autonomous execution control component 440, e.g., based on user preference data stored in the preferences storage 442 (such as preference data indicating that Amazon Music is the preferred music service of the user 5).

At a step 712 of the process 700, the graph manager 432 may add an edge between the nodes corresponding to the two entities for which the interaction was determined at the step 702. For example, for the nodes 502 and 504 in the CHG 500, the graph manager 432 may add an edge 506 between those two nodes.

At a step 714 of the process 700, the graph manager 432 may annotate the added edge to indicate the type of interaction that occurred between the two interconnected nodes. For example, the edge 506 of the CHG 500 may be annotated to indicate that the song represented by the node 504 was the target of the utterance represented by the node 502.

At a step 716 of the process 700, the graph manager 432 may annotate the added edge with the contextual data determined at the step 704. For example, the edge 506 of the CGH may be annotated with a value "22," indicating that the song represented by the node 504 was requested at 10:00 PM. As noted previously, such edge annotations may additionally or alternatively include any of a number of other types of contextual data, e.g., day of the week, an identifier of the device 110, one or more characteristics of the device 110 (e.g., that is a smartphone, a laptop, or a desktop), an indication that the user 5 was wearing Echo Buds, etc.

At a decision 718 of the process 700, the graph manager 432 may determine whether one or more criteria for adding a supplemental edge to the CHG 500 to indicate an affinity between two nodes are satisfied. For instance, the fact that a user (represented by a customer node 508) made a request (represented by the utterance node 502) that a particular song (represented by the song node 504) be played on more than a threshold number of occasions (e.g., more than five times) may indicate affinity for the song (represented by the song node 504) by the user (represented by the customer node 508). As such, based on those circumstances, the graph manager 432 may determine to add a supplemental edge 510 (per the step 720) to the CHG 500, and to annotate that supplemental edge (per the step 722) to describe that inferred affinity.

At a step 724 of the process 700, the supplemental edge (e.g., the edge 510) may be further annotated to include the contextual data that was used to annotate the previously added edge (e.g., the edge 506)), thus enabling the graph path reasoner 434 to recognize the affinity indicated by the supplemental edge within a particular contextual scenario (e.g., at 10:00 PM when the user 5 was wearing Echo Buds) during runtime, as described below.

FIG. 8 shows an example process 800 that may be performed by the graph manager 432 to add additional nodes and edges to the CHG 500 to represent relationships between various entities. For example, with reference to FIG. 5, pursuant to the process 800, the graph manager 432 may add one or more genre nodes (e.g., genre node 512), artist nodes (e.g., artist node 514) and/or song nodes (e.g., song node 516) to the CHG 500, as well as one or more edges (e.g., edge 518) indicating the relationships between those nodes.

As shown in FIG. 8, the process 800 may begin at a step 802, at which the graph manager 432 may determine that a relationship exists between two entities. Such a determination may be made in any of a number of ways. As noted above, in some implementations, the observation data represented by the arrow 402 may include data representing at least certain responses sent from the domain manager component(s) 130 to the device 110 in response to user queries, where such responses (e.g., "The song Song_name is sung by Artist_name") could be used to identify a relationship between entities. As indicated by an arrow 416 in FIG. 4, such response data may be passed to the data processing component 420, as raw entity relationship data. Further, as indicated by an arrow 418 in FIG. 4, in some implementations, raw entity relationship data may additionally or alternatively be obtained from a knowledgebase 450 (e.g., Wikipedia) that includes data describing how certain entities relate to other entities. The data processing component 420 may filter and/or reformat the raw entity relationship data it receives to generate processed entity relationship data that, as indicated by an arrow 422, may be provided to moment/action forecasting component 430. The graph manager 432 may use such processed entity relationship data to determine a relationship between two entities per the step 802 of the process 800.

At a decision 804 of the process 800, the graph manager 432 may determine whether the CHG 500 already includes nodes corresponding to the entities identified at the step 802.

When, the graph manager 432 determines (per the decision 804) that the CHG 500 does not already include nodes for one or both of the identified entities, the process 800 may proceed to a step 806, at which the graph manager 432 may add new entity node(s) to the CHG 500. Referring to FIG. 5, for example, if the processed entity relationship data indicated that "Artist 1" is a "pop" artist, the graph manager 432 may, at the step 806, add a node 512 to the CHG 500 that represents the genre "Pop" and/or add a node 514 to the CHG 500 that represents the artist "Artist 1."

At a step 808 of the process 800, similar to the step 710 of the process 700 (shown in FIG. 7), the graph manager 432 may annotate the node(s) added at the step 806 to identify the types of entities they represent, and possibly the actions that can be performed (e.g., play music, place an order, etc.) when such nodes are reached during a graph walking process performed by the GNN 160 of the graph path reasoner 434. For example, the graph manager 432 may annotate the node 512 to indicate that it represents the "pop" genre, as well as to indicate that it corresponds to a "play music" action. Further, in some implementations, the nodes corresponding to actions that can be performed (e.g., the genre node 512) may be further annotated to identify one or more particular processes and/or services that are to be used to perform the corresponding action (e.g., to indicate that the Amazon Music service is to be used to play music from the genre "pop" when the genre node 512 is reached during a graph walking process). In implementations in which such annotations to identify such particular process(es) and/or service(s) for performing actions are made, the graph manager 432 may create multiple nodes for the same entity type (e.g., genre) at the step 806. For example, in response to determining (per the step 802) that the entity represented by the node 514 (e.g., "Artist 1") is related to the entity represented by the node 512 (e.g., is within the "pop" genre), the graph manager 432 may create different entity nodes for the respective services that are available to play music from the genre "pop," e.g., Amazon Music, Spotify, etc., and may annotate such nodes accordingly, as described above, per the step 808. Additionally or alternatively, as explained further below, in some implementations, one or more particular process(es) and/or service(s) that are to be used to perform actions when such "action" nodes (e.g., the genre node 512 shown in FIG. 5) are reached may be determined by the autonomous execution control component 440, e.g., based on user preference data stored in the preferences storage 442 (such as preference data indicating that Amazon Music is the preferred music service of the user 5).

At a step 810 of the process 800, the graph manager 432 may add an edge between the nodes corresponding to the two entities for which the relationship was determined at the step 802. For example, for the nodes 512 and 514 in the CHG 500, the graph manager 432 may add the edge 518 between those two nodes.

At a step 812 of the process 800, the graph manager 432 may annotate the added edge to indicate the type of relationship that exists between the two interconnected nodes. For example, the edge 518 of the CHG 500 may be annotated to indicate that the artist represented by the node 514 is categorized within the genre represented by the node 512.

As noted above, in some implementations, the graph manager 432 may receive feedback data and/or preference data from the data ingestion component 410 (see the arrow 404 in FIG. 4) based various inputs to the device 110, such as inputs by the user 5 responding to prompts generated by the autonomous execution control component 440, or inputs corresponding to the user 5 tapping a "like" icon, or perhaps a "dislike" icon, when a given song is playing. FIG. 9 shows an example process 900 that may be employed by the graph manager 432 to modify the CHG 500 based on such received feedback data and/or preference data.

As shown in FIG. 9, the process 900 may begin at a step 902, at which the graph manager 432 may receive feedback data and/or preference data, e.g., from the data ingestion component 410. As one example, as described in more detail below, based on a reasoning state vector received from the graph path reasoner 434 (generated based on the content of the CHG 500 and the current contextual data), the autonomous execution control component 440 may determine to request customer confirmation that a particular moment exists (e.g., that the user 5 is "cooking") and/or that a particular action should be taken in view of the existence of such a moment. As indicated by an arrow 424 in FIG. 4, the autonomous execution control component 440 may instruct the domain manager component(s) 130 to send a prompt for such confirmation to a device associated with profile of the user 5, e.g., the device 110. The response to such a prompt may indicate, for example, an affinity for taking the identified action, or lack of affinity for taking the particular action, in the identified moment. As another example, the user 5 may provide an input expressly identifying an affinity, or perhaps distaste, for a particular entity, e.g., by clicking a "like" icon or a "dislike" icon while a particular song is playing.

At a step 904 of the process 900, the graph manager 432 may modify the CHG 500, based on the received feedback data and/or preference data, to reflect the indicated affinity, or lack of affinity, of the user 5 for one or more entities or actions. For instance, in some implementations, the graph manager 432 may add or remove one or more edges, and/or modify one or more edge annotations that were determined based on contextual data, such as an edge between a customer node (e.g., the customer node 508 shown in FIG. 5) and another node, e.g., the song node 504 shown in FIG. 5, a moment node (as described in connection with FIG. 6), etc., to reflect the indicated affinity, or lack thereof, in a particular contextual circumstance.

In some implementations, to enable a GNN 160 of the graph path reasoner 434 to identify moments based on near-real time contextual data (e.g., using the techniques described below), additional nodes, referred to herein as "moment nodes" may be inserted into a customer habitual graph, and initial annotated edges may be added between the inserted moment nodes and respective customer nodes. As explained below, once such moment nodes and corresponding initial edges have been inserted into a customer habitual graph (e.g., the CHG 500), the GNN 160 of the graph path reasoner 434 may traverse (or "walk") through the nodes of the graph, beginning with a particular customer node, and evaluate the strength of the connections between that customer node and the respective moment nodes to infer the existence of moments for the user corresponding to the starting customer node, as well as identify nodes corresponding to particular actions that can potentially be taken when such moments are identified. As indicated by an arrow 438 in FIG. 4, such initial moment nodes and corresponding connections (which may be referred to as "cold start data") may be provided, for example, by an administrator or developer device 405 as a part of a cold start process for the virtual assistant system 100. Over time, based on feedback provided by the user 5 in response to requests to confirm that certain moments exist and/or that certain actions are to be taken when moments are identified, the edges in the graph may be adjusted to reflect learned affinities of the user 5, thus improving the accuracy of the subsequent moment/action inferences that are made by the graph path reasoner 434.

Figure 6:
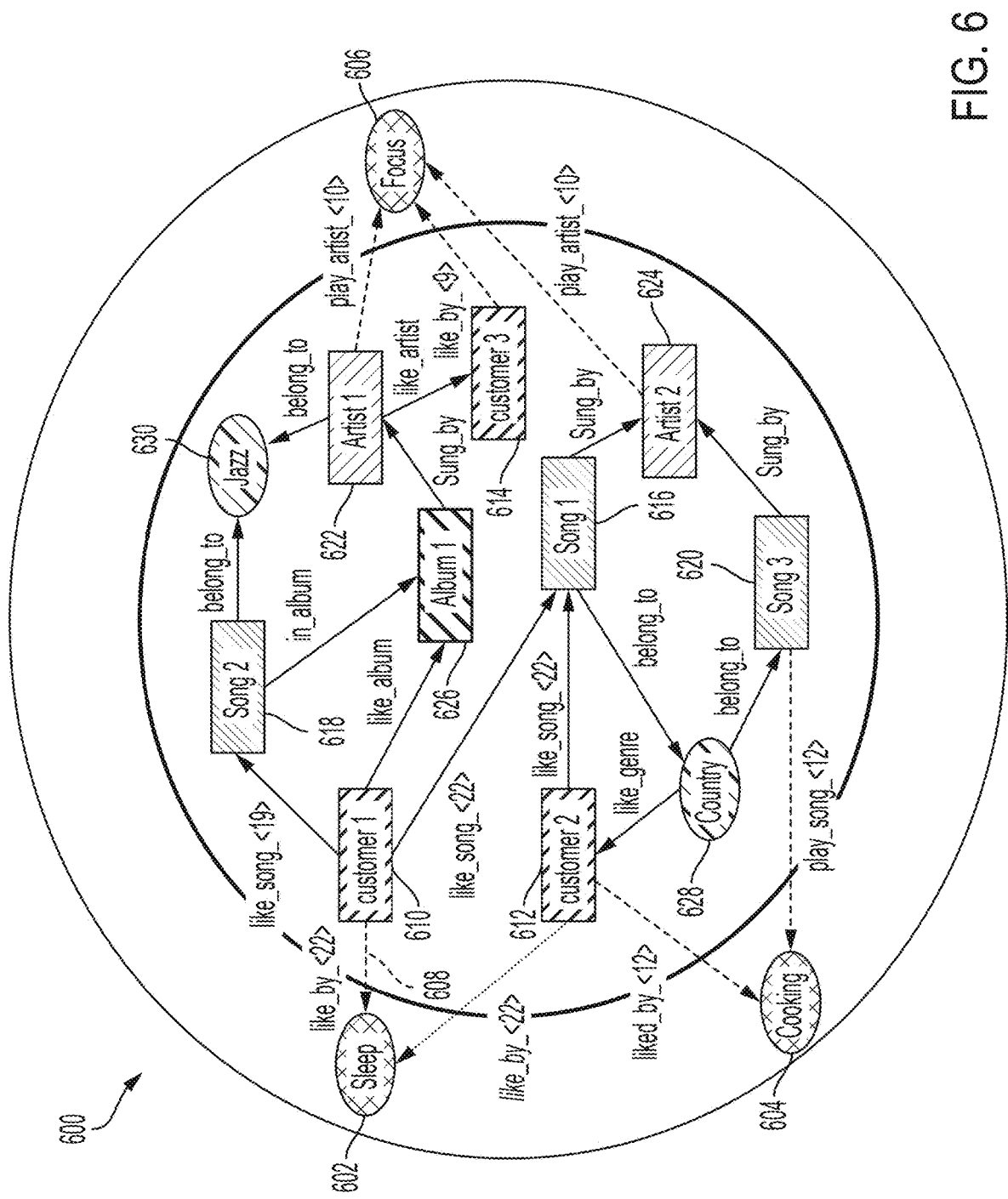
FIG. 6 shows an example customer habitual graph including moment nodes, according to embodiments of the present disclosure.

FIG. 6 shows an example CHG 600 that includes moment nodes 602, 604 and 604 (corresponding to a "sleep" moment, a "cooking" moment, and a "focus" moment, respectively), customer nodes 610, 612, 614, song nodes 616, 618, 620, artist nodes 622, 624, an album node 626, and genre nodes 628, 630. As noted above, in some implementations, an administrator or developer 405 may have inserted the moment nodes 602, 604, 606 and at least certain edges (e.g., an edge 608 between the moment node 602 and a customer node 610) into the CHG 600 as a part of a cold start process. It can be noted that utterance nodes (such as the utterance node 502 shown in FIG. 5) are not depicted in FIG. 6. In some implementations, the graph manager 432 may refrain from including such utterance nodes and corresponding edges in the CHG 600 as it is generated, and may instead determine and include only the "supplemental" edges representing affinities that can be inferred from those nodes/edges, e.g., as described in connection with the steps 720-724 of the process 700 (shown in FIG. 7). In other implementations, although not illustrated in FIG. 6, such utterance nodes and corresponding edges may actually be included in the CHG 600, together with the nodes and edges that are depicted, and may serve to further enrich the data that can be used by the GNN 160 of the graph path reasoner 434 during a node walking process. Further, although the edges shown in FIG. 6 are annotated only with contextual data representing the time of day (e.g., with the text "<22>" on the edge 608 representing a time window between 10:00 PM and 11:00 PM), the edges may additionally or alternatively be annotated with other contextual data to enable the GNN 160 of the graph manager 432 to infer moments and/or actions corresponding to the current contextual situation of the user 5 based on near real-time contextual data of the same type.

In some implementations, a customer habitual graph (e.g., the CHG 600) may include nodes corresponding to multiple domains, and may further include at least some edges that interconnect nodes corresponding to different domain types, such an edge connecting the song node 626 (shown in FIG. 6) to a "product" node of a purchase domain representing a purchased vinyl record including that song. Further, as shown in FIG. 6, the CHG 600 may include customer nodes 610, 612 and 614 for multiple customers, as well as various edges that connect different customer nodes, either directly or indirectly, to common nodes corresponding to other entities, e.g., the song node 616 or the album node 626. Such connections thus enable the inferring of affinities across different customers. For example, referring to FIG. 6, if "Customer 1" and "Customer 2" both like to listen to "Song 1" at 10:00 PM and there is an observed edge connection between the customer node 610 and the "sleep" moment node 602, then it can be inferred that there is likely an edge connection between the customer node 612 and the sleep moment node 602. Further, although not illustrated in FIG. 6, in some implementations, the graph manager 432 may add edges between different customer nodes (e.g., between the customer node 610 and the customer node 612) to identify a relationship between the corresponding users, e.g., to indicate that they are in the same family or are "friends" or "connections" on a social media platform.

Employing a heterogenous graphical representation, such as the CHG 600, enables a robust and dynamic representation of users' past interactions with entities, enhanced in some way to explicitly represent "knowledge." Such knowledge may include (A) personal knowledge about the users, (B) factual knowledge about the entities, and/or (C) structured knowledge of the interactions across users. With respect to personal knowledge about the user, the CHG 600 represents the entities that individual users have interacted with, the location of the users when such interactions occurred, the devices the users operated to engage in those interactions, etc. As noted above, the nodes of the CHG 600 represent different users and entities, while the edges capture the types of interactions, which may include but are not limited to the corresponding NLU intents. Some of the data in the CHG 600 may be based on the users' feedback-both implicit and explicit. The contextual information (discussed above) may capture the users' historical preferences under different conditions and may enable differentiation amongst the historical situations in which the various interactions occurred. For example, listening to meditation music at 10:00 PM could indicate a "Sleep" situation, while listening to the same music at 9:00 AM could indicate a "Focus" situation. The flexibility of the graph structure and the GNN technology (e.g., as described below) enable such contextual information to be injected into the CHG 600 in any of a variety of ways.

As noted above, in some implementations, the CHG 600 may additionally represent factual knowledge about various entities. This type of knowledge refers to different relations or attributes of the entities themselves, such as links between songs and artists, artists and genres, books and authors, is person entities from a knowledge domain and their occupations, etc. As noted above, in some implementations the content of query responses and/or knowledgebase data may be leveraged to inject this kind of knowledge into the CHG 600.

Finally, as also noted above, in some implementations, the CHG 600 may additionally represent structured knowledge of the interactions across multiple users. For example, the high-order connectivity across users can be captured in the CHG 600 and leveraged to discover unseen affinities for users in the graph representation learning.

Techniques that may be employed by the graph path reasoner 434 to use the contents of a customer habitual graph (e.g., the CHG 600), as well as near-real time contextual signals, to infer the existence of moments and/or to infer appropriate actions that can potentially be taken when such moments are identified will now be described. The graph path reasoner 434 may conduct the reasoning process (e.g., neural-driven symbolic reasoning) and interact with the autonomous execution control component 440 to traverse a path within the CHG 600 to make a decision (e.g., to play a certain genre of music or to order a particular item). More specifically, reasoning process may take contextual signals as input (e.g., time, date of the week, and potentially multi-modality signals) and perform a path walking process on the CHG 600 in order to predict the existence of a moment, and possibly also predict the actions the user 5 will likely want performed when a particular moment is identified. In some implementations, the data processing component 420 (shown in FIG. 4) may be responsible for filtering and aggregating the raw contextual received from the data ingestion component 410 to collect the types of contextual data that were used to annotate the edges of the graph, and then formatting the resulting data as features that can be consumed by the GNN 160 of the graph path reasoner 434.

Figure 11:
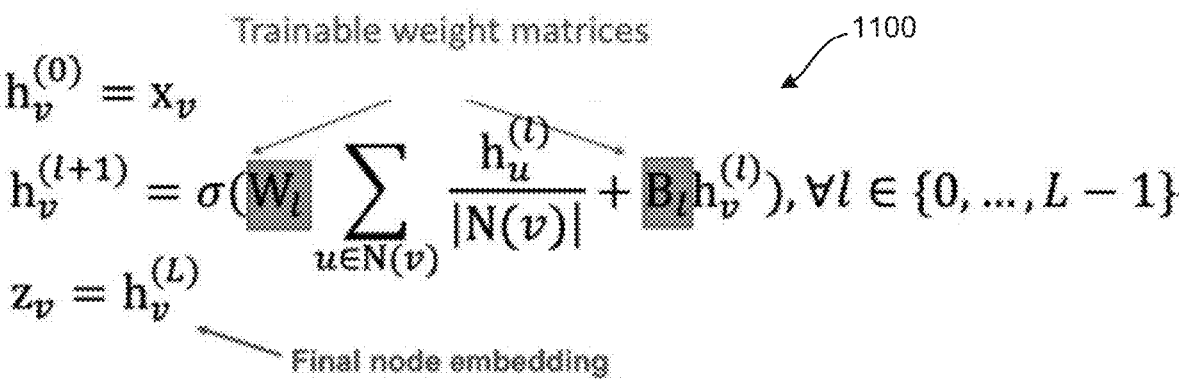
FIG. 11 is a simplified message passing equation that may be used by a graph neural network of the graph path reasoner shown in FIG. 4, according to embodiments of the present disclosure.
Figure 12:
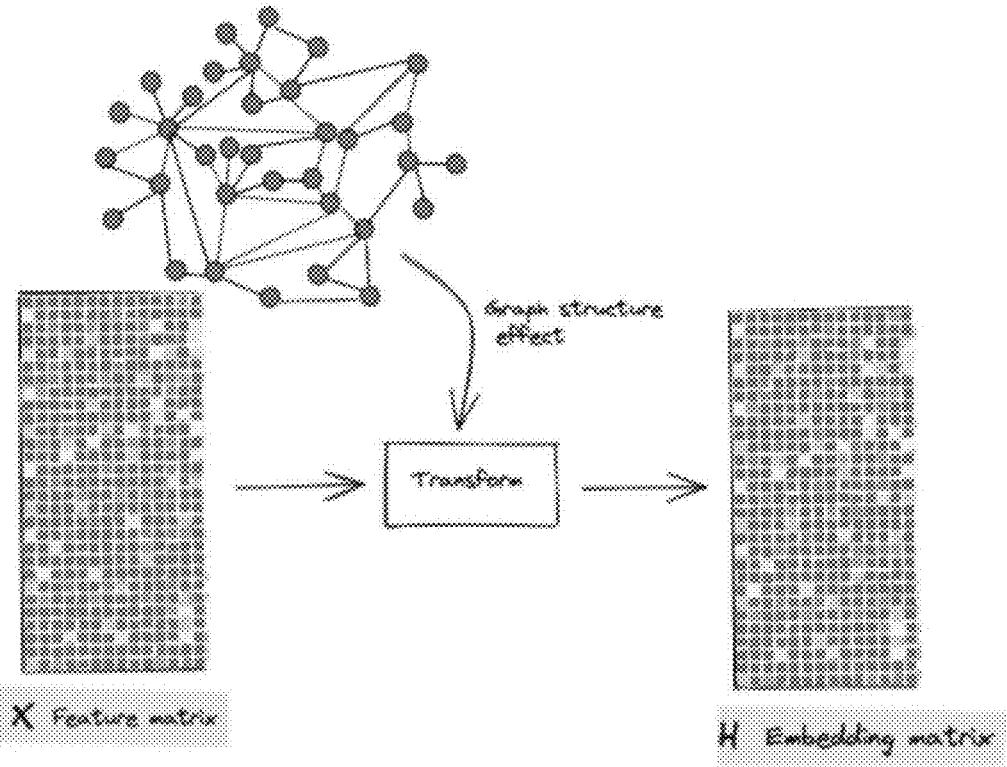
FIG. 12 illustrates conceptually how a feature matrix can be transformed into an embedding matrix within a graph neural network, according to embodiments of the present disclosure

GNN models, such as a relational graph convolution networks (R-GCNs) and heterogeneous graph attention networks (GATs), incorporate the type of entity or relation, path information, substructure information, and the intrinsic features of nodes into the learning process. This allows GNNs to be inductive, e.g., the models can generalize to unseen data and new nodes/edges can be added on the fly, without retraining the network. Moreover, the approach can leverage feature representations of the nodes/edges themselves as input to the node/edge encoder, like text encoding of entities, user utterances, request impression, etc. For example, lightweight text encoders may be adopted to tackle scalability challenges and extract node features for utterance nodes, entity nodes, etc. These benefits may be combined with convolutional neural networks and attention mechanisms to help generate better embeddings. Since the CHG 600 is a heterogeneous multi-graph, GNN techniques, such as R-GCN, can be used to learn node representations. A simplified message passing equation 1100 that may be used by the GNN 160 of the graph path reasoner 434 is shown in FIG. 11. In the equation 1100, xy is the initial feature representation of a node v, L is the number of layers in the GNN 160, or the hops that are made for neighborhood aggregation, and zy is the final node representation that is fed to a scoring function. FIG. 12 illustrates conceptually how the feature matrix "X" can be transformed into an embedding matrix "H."

Using the GNN 160, the final node representations zy of all the nodes are first determined by aggregating information from their neighbors. Once the final node representations zy of the nodes have been determined, the learning problem can be cast as a link prediction task, which may involve maximizing the score of a pair of nodes if an edge exists between them in the CHG 600, and minimizing the score for negatively sampled edges. The binary cross-entropy loss may be back-propagated through all the layers to learn the weights of GNN 160 (e.g., Wi and Bi in FIG. 11) as well as the different encoders that are to be used to generate the initial representations for all the nodes.

As an example of a path walking process, the GNN 160 may begin at a customer node associated with the user 5 and the contextual information may be passed to the customer mode to change the representation of that node, so that the representation of the customer node will depend on the time of day, the day of the week, the device 110 the user is operating, the current location of the user 5 (e.g., at home, in a car, at work, etc.), the current operational state the device 110 (e.g., playing music, running a timer, idle), etc. The GNN 160 may then use that modified representation of the customer node to identify the moment node that has the strongest connection (e.g., by performing a distance similarity comparison) with the customer node. In some implementations, if no moment node with a sufficiently strong connection to the customer node is found, the graph walking process may terminate. When a moment node with a sufficiently strong connection to the customer node is found, however, the representation of the customer node may be passed to the identified moment node, e.g., via message passing, so that the moment node then includes a representation of the initially received contextual information as well as information about the user. The GNN 160 may then use that modified representation of the identified moment node to identify an "action" node that has the strongest connection (e.g., by performing a distance similarity comparison) with the moment node. In some implementations, only certain types of nodes in the CHG may be deemed "action" nodes for this purpose. For instance, with respect to a music domain, song, album, artist, and/or genre nodes may be considered action nodes, since reaching one of those nodes may correspond to the action of playing music corresponding to the node. As another example, for a shopping domain, product nodes may be considered action nodes, since reaching one of those nodes may correspond to the action of purchasing the product. In some implementations, if no action node with a sufficiently strong connection to the moment node under consideration is found, the graph walking process may terminate.

For highly predictable and repeated behavior from users, e.g., the user 5 always orders garlic every week, the user 5 always listens to "pop" music during the afternoon, etc., one hop look-up can be employed. However, some repeated, but latent, habits may require ambient-aware multi-hop reasoning. For example, if the user 5 has a habit of having fish tacos for Sunday dinner, the temporal information carried in an edge between a customer node and a meal node may trigger a graph update at that time through multi-hop message passing from a meal node to one or more ingredient nodes. As another example, if the user 5 has a habit of listing to "Song_Name_A" and "Song_Name_B" while working out, the graph path reasoner 434 can infer the user's music genre preference is "hard rock" through messaging passing, and can further infer that the user 5 is likely to want to play music from that same genre once we detect user 5 is working out.

Although not shown in FIG. 4, in response to the graph path reasoner 434 inferring the existence of a moment for a user, the moment/action forecasting component 430 may take steps to inform one or more other components/services that such a moment has been identified, without necessarily determining an appropriate action to take based on the identified moment. For instance, in some implementations, data representing the determination of moments may be stored in a storage medium that is accessible to other component. Those other services can then somehow discover that new moments for have been identified for certain users, e.g., by querying the database or via a subscription component, and can themselves determine an appropriate action to take with respect to the user based on the identified moment.

As indicated by an arrow 426 in FIG. 4, when the graph path reasoner 434 successfully walks from a customer node to a moment node, and then to an action node (as described above), the graph path reasoner 434 may pass a reasoning state vector to the autonomous execution control component 440. The reasoning state vector received by the autonomous execution control component 440 may include a representation of the action node that was identified, and may also include representations of other nodes in the path that was traversed to reach that node. As noted above, the identified action node may already include state information that was accumulated from the other nodes that were reached during the walking process. Further, in some implementations, the reasoning state vector received by the autonomous execution control component 440 may additionally include other contextual information that is not stored in the CHG 600, such as the time of day, day of the week, user location, device type, device state, etc.

Based on the reasoning state vector received from the graph path reasoner 434, the autonomous execution control component 440 may determine, for example, whether to request user confirmation that the identified action should be taken, to take the identified action without requesting such confirmation, or to do nothing. The autonomous execution control component 440 may take only any of numerous forms. In some implementations, for example, the autonomous execution control component 440 may include a reinforced learning (RL) based self-learning feedback policy network 1300 (see FIG. 13) that is configured to solicit a customer's answer when the model is not sure what to do, e.g., is the customer allergic to seafood?, does the customer like listening to relaxing music in the evening?, does the customer prefer to automatically turn off the light after they set up alarm, etc. Such a self-learning feedback policy network may thus engage with the user 5 during the reasoning process and the answers from the user 5 may directly impact the reasoning path as well as the information stored in the CHG 600 for future precision improvement. The information from the feedback may also be fed into a system for training the model offline to improve the model performance over time.

Figure 13:
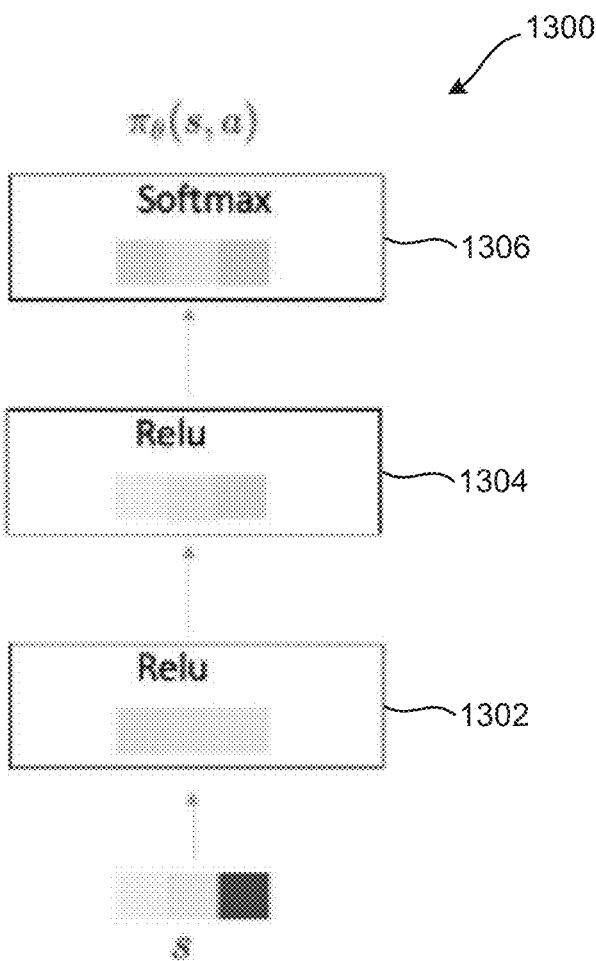
FIG. 13 shows an example policy network that may be employed within the autonomous execution control component shown in FIG. 4, according to embodiments of the present disclosure.

As shown in FIG. 13, the policy network 1300 may include rectified linear unit (ReLU) activation function layers 1302, 1304 and a Softmax layer 1306, and may implement the policy network $\pi_\theta(s, \alpha)=P(\alpha|s; \theta)$, which maps the reasoning state vector s to a stochastic policy P for determining actions a, such as (A) requesting user confirmation that the identified action should be taken, (B) taking the identified action without requesting such confirmation, or (C) doing nothing. The neural network parameters $\theta$ may be updated using stochastic gradient decent. As noted previously, the reasoning state vector may be represented, for example, through embeddings from the path history, combining with neighbor node representations through message passing. The output of the Softmax layer 1306 may output values representing a probability distribution across the possible actions a noted above, e.g., (A) requesting user confirmation that the identified action should be taken, (B) taking the identified action without requesting such confirmation, or (C) doing nothing.

As indicated by the arrow 424 in FIG. 4, depending on the content of the reasoning state vector received from the graph path reasoner 434, the autonomous execution control component 440 may either do nothing, or else send to the domain manager component(s) 130 (A) an instruction to perform a particular action with respect to the profile of the user 5, e.g., to play music in a certain genre, to order a particular item, or (B) a prompt for user confirmation that an action is to be taken, or perhaps to clarify some point of uncertainty encountered during the reasoning process. As noted above, in some implementations, the autonomous execution control component 440 may use preference data associated with the user 5 to determine one or more particular processes and/or services to use to perform the identified action, such as by using a particular streaming service, e.g., Amazon Music, to play music corresponding to a genre node reached during the path waking process performed by the GNN 160 of the graph manager 432. In some implementations, the instruction and/or prompt sent to the component(s) 130 (per the arrow 424) may include an indication of the process(es) and/or service(s) identified by the preference data of the user 5. In some implementations, user-specific preference data obtained from the preferences storage 442 may additionally or alternatively used by one or models of the autonomous execution control component 440 to determine one or the actions a corresponding to the output of the Softmax layer, as noted above. In some implementations, a supervised learning process may be used to train the model(s) that are used by the autonomous execution control component 440 to evaluate the reasoning state vector 426 received from the graph path reasoner 434, and possibly also user-specific preference data corresponding to the user 5 from the preferences storage 442.

When the autonomous execution control component 440 sends a prompt instruction to the domain manager component(s) 130, the domain manager component(s) 130 may cause the device 110 to prompt the user 5 to provide a response (e.g., by outputting audio stating "It looks like you're exercising, do you want me to play hard rock music?"). The user's response to that prompt may then be fed (via the domain manager component(s) 130 and the data ingestion component 410) to the graph manager 432 and the autonomous execution control component 440. The graph manager 432 and/or the autonomous execution control component 440 may use the response to update the CHG 600 and/or the policy network 1300 in an appropriate fashion. The autonomous execution control component 440 may also use the response to either determine to take the suggested action, e.g., by sending another instruction to the domain manager component(s) 130, or else determine not to take the action.

FIG. 14 is a block diagram conceptually illustrating a device 110 that may be used with the system. FIG. 15 is a block diagram conceptually illustrating example components of a remote device, such as the natural language command processing NLP system component(s) 210, which may assist with ASR processing, NLU processing, etc., and a skill system component 225. A system (210/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/ components either physically and/or over one a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/NLP system component(s) 210 may be located remotely from the device 110 as its operations may not require proximity to the user. The server/NLP system component(s) 210 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The system component(s) 210 may also be a version of a user device 110 that includes different (e.g., more) processing capabilities than other user device(s) 110 in a home/office. One benefit to the server/NLP system component(s) 210 being in a user's home/business is that data used to process a command/return a response may be kept within the user's home, thus reducing potential privacy concerns.

Multiple components (210/225) may be included in the overall virtual assistant system 100 of the present disclosure, such as one or more natural language processing systems 210 for performing ASR processing, one or more natural language processing systems 210 for performing NLU processing, one or more skill system component(s) 225, etc. In operation, each of these systems may include computer-readable and computer-executable instructions that reside on the respective device (210/225), as will be discussed further below.

Each of these devices (110/210/225) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/210/225) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/210/225) may also be connected to removable or external non-volatile memory and/or storage (such as a removable memory card, memory key drive, networked storage, etc.) through respective input/output device interfaces (1402/1502).

Computer instructions for operating each device (110/210/225) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/210/225) includes input/output device interfaces (1402/1502). A variety of components may be connected through the input/output device interfaces (1402/1502), as will be discussed further below. Additionally, each device (110/210/225) may include an address/data bus (1424/1524) for conveying data among components of the respective device. Each component within a device (110/210/225) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1422, the input/output device interfaces 1402 may connect to one or more networks 1400 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 1400, the system may be distributed across a networked environment. The I/O device interface (1402/1502) may also include communication components that allow data to be exchanged between devices such as different physical servers in a collection of servers or other components.

The components of the device(s) 110, the natural language command processing NLP system component(s) 210, or a skill system component 225 may include their own dedicated processors, memory, and/or storage. Alternatively, one or more of the components of the device(s) 110, the natural language command processing NLP system component(s) 210, or a skill system component 225 may utilize the I/O interfaces (1402/1502), processor(s) (1404/1504), memory (1406/1506), and/or storage (1408/1508) of the device(s) 110, natural language command processing NLP system component(s) 210, or the skill system component(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing NLP system component(s) 210, and a skill system component 225, as described herein, are illustrative, and may be located as a stand-alone device or may be included, in whole or in part, as a component of a larger device or system. As can be appreciated, a number of components may exist either on a NLP system component(s) 210 and/or on device 110. For example, language processing 292/392 (which may include ASR 250/350), language output 293/393 (which may include NLG 279/379 and TTS 280/380), etc., for example as illustrated in FIGS. 2 and 3. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 16, multiple devices (110a-110n, 210, 225) may contain components of the system and the devices may be connected over one or more network(s) 1400. The network(s) 1400 may include a local or private network or may include a wide network such as the Internet. Devices may be connected to the network(s) 1400 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 1400 through a wireless service provider, over a Wi-Fi or cellular network connection, or the like. Other devices are included as network-connected support devices, such as the natural language command processing NLP system component(s) 210, the skill system component(s) 225, and/or others. The support devices may connect to the network(s) 1400 through a wired connection or wireless connection. Networked devices may capture audio using one-or-more built-in or connected microphones or other audio capture devices, with processing performed by ASR components, NLU components, or other components of the same device or another device connected via the network(s) 1400, such as the ASR component 250, the NLU component 260, etc. of the natural language command processing NLP system component(s) 210.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method performed by a computing system to cause an electronic device to perform an operation corresponding to a first action taken by a first application, the method comprising:

receiving first data representing a contextual state corresponding to a first user associated with a first user profile, wherein the first data is not received contemporaneously with a request by the first user to perform the operation or take the first action;

processing the first data using a machine learning model to determine that the first user is in a first situational context corresponding to at least one of (a) a location of the first user, (b) an activity of the first user, or (c) an occurrence corresponding to the location of the first user;

determining that the first action is associated with the first situational context;

causing the first application to take the first action;

determining that the electronic device corresponds to the first user profile; and sending, from the computing system to the electronic device via a network, at least one instruction that causes the electronic device to perform the operation.

2. The method of claim 1, further comprising:

determining graph data representing a plurality of situational contexts, the graph data including first node data representing a first node corresponding to the first user, and second node data representing a second node corresponding to the first situational context of the plurality of situational contexts;

wherein processing the first data using the machine learning model includes:

using the first data to determine a value corresponding to a strength of a connection between the first node and the second node, and determining that the first user is in the first situational context based at least in part on the value.

3. The method of claim 2, wherein using the first data to determine the value comprises:

using the graph data and the first data to traverse from the first node to the second node.

4. The method of claim 3, wherein the graph data further includes third node data representing a third node corresponding to the first action, and determining the first action comprises:

using the graph data and the first data to traverse from the second node to the third node.

5. The method of claim 4, further comprising:

receiving, by at least one component, second data representing processing of the first data with respect to the third node data;

determining, by the at least one component and based at least in part on the second data, to cause the electronic device to output data requesting user input; and receiving input data indicating that the first user has confirmed that the first action is to be executed;

wherein the at least one instruction is sent to the electronic device based at least in part on the input data.

6. The method of claim 5, further comprising:

determining updated graph data based at least in part on the input data.

7. The method of claim 4, further comprising:

receiving, by at least one component, second data representing processing of the first data with respect to the third node data; and determining, by the at least one component and based at least in part on the second data, to send the at least one instruction to the electronic device without requiring further input from the first user.

8. The method of claim 2, wherein:

the graph data further includes:

third node data representing a third node corresponding to a second situational context of the plurality of situational contexts, and fourth node data representing a fourth node corresponding to a second action; and the method further comprises, after receiving the first data:

receiving second data representing a second contextual state of the first user, determining, using the second data and the graph data, that the first user is in the second situational context, based at least in part on the first user being in the second situational context, determining that the second action is to be taken by a second application system with respect to the first user profile, causing the electronic device to output data requesting user input, receiving input data indicating that the first user has indicated that the second action is not to be executed, and based at least in part on the input data, refraining from causing the second application system from taking the second action.

9. The method of claim 8, further comprising:

determining updated graph data based at least in part on the input data.

10. A system for causing an electronic device to perform an operation corresponding to a first action taken by a first application, comprising:

at least one processor; and at least one computer-readable medium encoded with instructions which, when executed by the at least one processor, cause the system to:

receive first data representing a contextual state corresponding to a first user associated with a first user profile, wherein the first data is not received contemporaneously with a request by the first user to perform the operation or take the first action;

process the first data using a machine learning model to determine that the first user is in a first situational context corresponding to at least one of (a) a location of the first user, (b) an activity of the first user, or (c) an occurrence corresponding to the location of the first user;

determine that the first action is associated with the first situational context;

cause the first application to take the first action;

determine that the electronic device corresponds to the first user profile; and send, from the system to the electronic device via a network, at least one instruction that causes the electronic device to perform the operation.

11. The system of claim 10, wherein the at least one computer-readable medium is further encoded with additional instructions which, when executed by the at least one processor, further cause the system to:

determine graph data representing a plurality of situational contexts, the graph data including first node data representing a first node corresponding to the first user, and second node data representing a second node corresponding to the first situational context of the plurality of situational contexts; and process the first data using the machine learning model at least in part by:

using the first data to determine a value corresponding to a strength of a connection between the first node and the second node, and determining that the first user is in the first situational context based at least in part on the value.

12. The system of claim 11, wherein the instructions that cause the system to use the first data to determine the value comprise instructions that, when executed by the at least one processor, cause the system to:

use the graph data and the first data to traverse from the first node to the second node.

13. The system of claim 11, wherein the graph data further includes third node data representing a third node corresponding to the first action and wherein the at least one computer-readable medium is further encoded with additional instructions which, when executed by the at least one processor, further cause the system to determine the first action at least in part by:

using the graph data and the first data to traverse from the second node to the third node.

14. The system of claim 13, wherein the at least one computer-readable medium is further encoded with additional instructions which, when executed by the at least one processor, further cause the system to:

receive, by at least one component, second data representing processing of the first data with respect to the third node data;

determine, by the at least one component and based at least in part on the second data, to cause the electronic device to output data requesting user input;

receive input data indicating that the first user has confirmed that the first action is to be executed; and send the at least one instruction to the electronic device based at least in part on input data.

15. The system of claim 14, wherein the at least one computer-readable medium is further encoded with additional instructions which, when executed by the at least one processor, further cause the system to:

determine updated graph data based at least in part on the input data.

16. The system of claim 13, wherein the at least one computer-readable medium is further encoded with additional instructions which, when executed by the at least one processor, further cause the system to:

receive, by at least one component, second data representing processing of the first data with respect to the third node data; and determine, by the at least one component and based at least in part on the second data, to send the at least one instruction to the electronic device without requiring further input from the first user.

17. The system of claim 11, wherein:

the graph data further includes:

third node data representing a third node corresponding to a second situational context of the plurality of situational contexts, and fourth node data representing a fourth node corresponding to a second action; and the at least one computer-readable medium is further encoded with additional instructions which, when executed by the at least one processor, further cause the system to, after receipt of the first data:

receive second data representing a second contextual state of the first user, determine, using the second data and the graph data, that the first user is in the second situational context, based at least in part on the first user being in the second situational context, determine the second action is to be taken by a second application system with respect to the first user profile, cause the electronic device to output data requesting user input, receive input data indicating that the first user has indicated that the second action is not to be executed, and based at least in part on the input data, refrain from causing the second application system from taking the second action.

18. The system of claim 17, wherein the at least one computer-readable medium is further encoded with additional instructions which, when executed by the at least one processor, further cause the system to:

determine updated graph data based at least in part on the input data.

* * * * *